United States Patent
Few et al.

(10) Patent No.: US 12,202,702 B2
(45) Date of Patent: Jan. 21, 2025

(54) EDGE SENSING APPARATUS IN AUTOMATED TRANSACTION MACHINE

(71) Applicant: Diebold Nixdorf, Incorporated, Hudson, OH (US)

(72) Inventors: David Z Few, Wadsworth, OH (US); Boley Clinton, Mogador, OH (US); Marko Savcic, Uniontown, OH (US); Michael J Harty, Canton, OH (US); Ken Turocy, Wadsworth, OH (US); Thomas A Vankirk, Medina, OH (US); Aaron Christopher Graham, Mogadore, OH (US); David Nikkel, Wooster, OH (US); Jasen James Smolk, Ravenna, OH (US); William Daniel Beskitt, Canton, OH (US)

(73) Assignee: DIEBOLD NIXDORF INCORPORATED, North Canton, OH (US)

( * ) Notice: Subject to any disclaimer, the term of this patent is extended or adjusted under 35 U.S.C. 154(b) by 0 days.

(21) Appl. No.: 18/244,467

(22) Filed: Sep. 11, 2023

(65) Prior Publication Data

US 2023/0416031 A1 Dec. 28, 2023

Related U.S. Application Data

(63) Continuation of application No. 17/598,501, filed as application No. PCT/US2020/034677 on May 27, 2020, now Pat. No. 11,753,263.

(Continued)

(51) Int. Cl.
*B65H 7/14* (2006.01)
*B65H 7/10* (2006.01)
(Continued)

(52) U.S. Cl.
CPC .............. *B65H 7/14* (2013.01); *B65H 7/10* (2013.01); *B65H 7/20* (2013.01); *B65H 9/002* (2013.01);
(Continued)

(58) Field of Classification Search
CPC ... B65H 7/10; B65H 7/14; B65H 7/20; B65H 9/103; B65H 9/106; B65H 2301/3613;
(Continued)

(56) References Cited

U.S. PATENT DOCUMENTS 7,633,605 B1 * 12/2009 Kallin .................... G07D 11/22
356/71
7,641,037 B2 * 1/2010 Nireki .................... G07D 7/121
194/207

(Continued)

OTHER PUBLICATIONS

International Search Report Filed in the Corresponding International Application Dated Aug. 12, 2020; 2 Pages.
(Continued)

*Primary Examiner* — Prasad V Gokhale
(74) *Attorney, Agent, or Firm* — Black McCuskey

(57) ABSTRACT

A sensing apparatus can be configured to detect an edge of a paper that is received by an automated transaction machine (ATM). The paper can move along a path located inside the ATM, the path having opposite first and second sides. The sensing apparatus can include a light emitter and a light detector on the first side of the path, with the light emitter positioned so that it can emit light across the path to the second side. The light detector can be configured to detect light from the light emitter and can emit a signal corresponding to an amount of detected light. The sensing apparatus can also include a control circuit that can control a flow of power to the light emitter, and the control circuit can also receive the signal emitted by the sensor.

19 Claims, 18 Drawing Sheets

Related U.S. Application Data

(60) Provisional application No. 62/855,032, filed on May 31, 2019.

(51) Int. Cl.
*B65H 7/20* (2006.01)
*B65H 9/00* (2006.01)
*B65H 9/20* (2006.01)
*G02B 17/02* (2006.01)
*G07D 11/237* (2019.01)
*G07D 11/40* (2019.01)

(52) U.S. Cl.
CPC ............ *B65H 9/20* (2013.01); *G02B 17/023* (2013.01); *G07D 11/237* (2019.01); *G07D 11/40* (2019.01); *B65H 2553/412* (2013.01); *B65H 2553/414* (2013.01); *B65H 2553/416* (2013.01); *B65H 2701/1912* (2013.01); *G07D 2211/00* (2013.01)

(58) Field of Classification Search
CPC ............ B65H 2553/40; B65H 2553/41; B65H 2553/414; B65H 2553/416
See application file for complete search history.

(56) References Cited

U.S. PATENT DOCUMENTS

| | | |
|---|---|---|
| 11,753,263 B2 | 9/2023 | Few et al. |
| 2002/0027208 A1* | 3/2002 | Haque ................ B65H 23/0216 356/615 |
| 2003/0025090 A1* | 2/2003 | Iwasaki .................... B65H 7/14 250/559.12 |
| 2005/0127310 A1* | 6/2005 | Sekiya ............... G01N 21/8901 250/559.4 |
| 2008/0048017 A1* | 2/2008 | Nireki .................... G07D 11/14 271/259 |
| 2008/0273789 A1 | 11/2008 | Bell |
| 2009/0295076 A1* | 12/2009 | Kato ...................... B65H 9/103 271/228 |
| 2011/0019900 A1 | 1/2011 | Nireki |
| 2018/0265319 A1* | 9/2018 | Weigold ............... G07D 11/125 |
| 2018/0327206 A1 | 11/2018 | Cost |

OTHER PUBLICATIONS

Written Opinion of the International Searching Authority Filed in the Corresponding International Application Dated Aug. 12, 2020; 11 Pages.

International Preliminary Report on Patentability Filed in the Corresponding International Application Dated Nov. 16, 2021; 12 pages.

* cited by examiner

EDGE SENSING APPARATUS IN AUTOMATED TRANSACTION MACHINE

CROSS-REFERENCE TO RELATED APPLICATIONS

This application is a National Phase filing of International Application Ser. No. PCT/US2020/034677, for an EDGE SENSING APPARATUS IN AN AUTOMATED TRANSACTION MACHINE, filed May 27, 2020, which claimed the benefit of U.S. Provisional Patent Application Ser. No. 62/855,032 for an EDGE SENSING APPARATUS IN AN AUTOMATED TRANSACTION MACHINE, filed on May 31, 2019, and is hereby incorporated by reference in its entirety.

BACKGROUND

1. Field

The present disclosure generally relates to an edge sensing apparatus used in an automated transaction machine.

2. Description of Related Prior Art

Banking machines are known in the prior art. Automated banking machines are commonly used to carry out transactions such as dispensing cash, checking account balances, paying bills and/or receiving deposits from users. Other types of banking machines may be used to purchase tickets, to issue coupons, to present checks, to print scrip and/or to carry out other functions either for a consumer or a service provider.

Automated banking machines often have the capability of accepting deposits from users. Such deposits may include items such as envelopes containing checks, credit slips, currency, coin or other items of value. Mechanisms have been developed for receiving such items from the user and transporting them into a secure compartment within the banking machine. It is desirable for the paper notes or documents that are manually loaded by customers to be centered and properly aligned so that they can be more effectively transported and stored in an orderly fashion.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A sensing apparatus can be configured to detect an edge of a paper that is received by an automated transaction machine (ATM). The paper can move along a path located inside the ATM, and the path can have a first side and a second side, so that the first and second sides are opposite to each other. The sensing apparatus can include a light emitter on the first side of the path, with the light emitter positioned so that the light emitter can emit light across the path to the second side. The sensing apparatus can also include a light detector on the first side of the path with the light emitter, and the light detector can be configured to detect light from the light emitter and can emit a signal corresponding to an amount of detected light. The sensing apparatus can also include a control circuit that can control a flow of power to the light emitter, and the control circuit can also receive the signal emitted by the light detector. In other features, the sensing apparatus can also include a light guiding trough located on the second side of the path. The light guiding trough can have a first and a second face, and each of the first and second faces of the light guiding trough can face the path. The first face of the light guiding trough can be positioned to confront the light emitter, and can receive light emitted by the light emitter. The second face of the light guiding trough can be positioned to confront the light detector and can emit light toward the light detector.

According to other features, the first and second faces of the light guiding trough can be a rectangular shape and can have a short axis and a long axis. The long axes of the light guiding trough can be transverse to the path of movement of the paper. Moreover, the first and second faces of the light guiding trough can be coplanar.

According to other features, the light emitter can emit a field of light centered on a primary light axis that can be transverse to the path. The light guiding trough can include a first external surface defining a first internal reflective plane and a second external surface defining a second internal reflective plane. Light can project from the light emitter in a first direction from the first side of the path toward the second side of the path. The light can then enter the light guiding trough through the first face along the primary light axis, then reflect off of the first internal reflective plane in a second direction toward the second internal reflective plane. The light can then reflect off of the second internal reflective plane in a third direction toward the second face toward the light detector. Moreover, the first external surface of the light guiding trough and the second external surface can be spaced from one another along the path, and the second direction can also be along the path.

According to other features, the light emitter and the light detector can be offset from each other in a direction transverse to the path of movement of the paper. Additionally, the light emitter and the light detector can be spaced from one another along the path.

According to other features, the light guiding trough can have a two-dimensional truncated vee-shape in a first plane. The first plane can be parallel to the path, and the truncated vee-shape can have a first end, a second end, and a linear truncated end. The light guiding trough can be further spatially defined by the truncated vee-shape extending along a trough axis normal to the first plane and the path, and can create a three-dimensional truncated vee-shaped volume. The volume can have a first linear end, a second linear end and a planar truncated end. The first face can be bounded on one side by the first linear end of the three-dimensional truncated vee-shaped volume, and the second face of the light guiding trough can bounded on one side by the second linear end of the three-dimensional truncated vee-shaped volume. The light guiding trough can be configured such that light received by the first face at a point along the trough axis can be reflected internally across the planar truncated end and can then be emitted from the second face at the point along the trough axis.

A method for detecting an edge of a paper received in an ATM can include positioning at least one light emitter along the path of movement of the paper on the first side of the path, the path defined in the ATM, and the light emitter emitting light across the path to the second side of the path, with the second side of the path the opposite of the first side of the path. The method can also include positioning at least one light detector along the path on the first side of the path with the light emitter, where the light detector can be configured to detect light and emit a signal corresponding to an amount of detected light, controlling a flow of power to the light emitter with the control circuit, and receiving a signal emitted from the light detector with the control circuit. The method can also include positioning the first and second faces of at least one light guiding trough toward the path on the second side of the path. The first face can confront the light emitter and can thereby receive light emitted by the light emitter. The second face can confront the light detector and can thereby emit light toward the light detector.

According to other features, the method can include defining the path in the ATM between a top platen and a bottom platen. The method can also include supporting at least one plate on the top platen for movement toward and away from a central axis of the path. The method can also include mounting the at least one light emitter and the at least one light detector on the at least one plate. The method can also include mounting the at least one light guiding trough on the bottom platen. The method can also include positioning at least one roller in between the top platen and the bottom platen. The at least one roller can be configured to engage the paper and can move at least a portion of the paper transverse to the path. The method can also include positioning at least one wheel in between the top platen the bottom platen. The at least one wheel can be configured to engage the paper and move at least a portion of the paper transverse to the path. The method can also include directing light emitted by the at least one light emitter a greater distance parallel to the central axis of the path than transverse to the central axis.

According to another feature, the positioning of the at least one light emitter can be further defined as positioning a plurality of light emitters spaced from one another along the path on the first side of the path. The positioning of the at least one light detector can be further defined as positioning a plurality of light detectors spaced from one another along the path on the first side of the path with the plurality of light emitters. The controlling of the flow of power can be further defined as controlling the flow of power to each of the plurality of light emitters with the control circuit. The receiving of the signal can be further defined as receiving respective signals emitted from each of the plurality of light detectors with the control circuit. The positioning of the first and second faces of the light guiding troughs can be further defined as positioning respective first and second faces of a plurality of light guiding troughs toward the path on the second side of the path, wherein each of the respective first faces can confront one of the plurality of light emitters and can thereby receive light emitted by the respective light emitter. Each of the respective second faces can confront one of the plurality of light detectors and can thereby emit light toward the respective light detector. The supporting of the at least one plate can be further defined as supporting a first plate and a second plate on the top platen for movement toward and away from the central axis of the path. The movement of the first plate can be mirrored by the movement of the second plate across the central axis. The positioning of the at least one wheel can be further defined as positioning a first wheel and a second wheel in between the top platen and the bottom platen, spaced from one another along the central axis. Each of the first wheel and the second wheel can be configured to engage the paper and can move at least a portion of the paper transverse to the path.

According to additional features, the method can further include fixing a first light emitter and a second light emitter of the plurality of light emitters to the first plate. The method can also include fixing a third light emitter and a fourth light emitter of the plurality of light emitters and a third light detector and a fourth light detector of the plurality of light detectors to the second plate. The method can also include emitting light from each of the first, second, third and fourth light emitters whereby light can be received by each of the first, second, third and fourth light detectors. The method can also include receiving a paper on the path between the top platen and the bottom platen. The method can also include moving the first plate and the second plate toward the central axis of the path. The method can also include monitoring with the control circuit respective signals from the first, second, third and fourth light detectors during the moving. The method can also include initiating, with the control circuit, rotation of the one of the first wheel and second wheel in response to a first detected amount of light received by at least one of the first, second, third and fourth light detectors dropping below a predetermined amount during the monitoring. The one of the first wheel and second wheel can be the closest of the first wheel and the second wheel to the at least one of the first, second, third and fourth light detectors at which the first detected amount of light dropped below the predetermined amount. The direction of rotation can cause the at least a portion of the paper to move toward the central axis of the path. The method can also include maintaining, with the control circuit, the other of the first wheel and second wheel stationary until a second detected amount of light received by another of the first, second, third and fourth light detectors drops below the predetermined amount during the monitoring.

An ATM can include a center and de-skew assembly that can be configured to receive a paper. The center and de-skew assembly can include a first platen defining a first side of a path of movement of the paper. The center and de-skew assembly can also include a second platen that defines a second side of the path opposite the first side. The path can be defined by a gap between the first platen and the second platen. The center and de-skew subassembly can also include at least one plate mounted on the first platen for movement toward and away from a central axis of the path. The center and de-skew assembly can also include at least one roller extending into the gap between the first platen and the second platen. The roller can be configured to engage the paper and move the paper along the path. The center and de-skew assembly can also include at least one wheel extending into the gap. The wheel can be configured to engage the paper and move at least a portion of the paper transverse to the path. The ATM can also include at least one sensing apparatus positioned along the path, configured to detect an edge of the received paper. The at least one sensing apparatus can include at least one light emitter mounted on the at least one plate and thereby positioned along the path on the first side of the path. The at least one light emitter can be directed to emit light across the path to the second side of the path. The at least one sensing apparatus can also include at least one light detector mounted on the at least one plate and can thereby be positioned along the path on the first side with the at least one light emitter. The at least one light detector can be configured to detect light and emit a signal corresponding to an amount of detected light. The at least one sensing apparatus can also include a control circuit configured to control a flow of power to the at least one light emitter. The control circuit can also be configured to receive the signal emitted by the at least one light detector. The at least one sensing apparatus can also include at least one light guiding trough positioned on the second side of the path and having first and second faces. Each of the first and second faces can face the path. The first face can be positioned to confront the at least one light emitter and can thereby receive light emitted by the at least one light emitter. The second face can be positioned to confront the at least one light detector and thereby emit light toward the at least one light detector.

According to other features, the at least one light emitter can emit a field of light centered on a primary light axis that can be transverse to the path. The at least one light guiding trough can include a first external surface defining a first internal reflective plane and a second external surface defining a second internal reflective plane. The light can project from the at least one light emitter in a first direction from the first side of the path toward the second side of the path. The light can then enter the at least one light guiding trough through the first face along the primary light axis. The light can then reflect off of the first internal reflective plane in a second direction toward the second internal reflective plane. The light can then reflect off of the second internal reflective plane in a third direction toward the second face. The light can then then pass out of the second face toward the at least one light detector. The first external surface and the second external surface can be spaced from the second platen such that a first air gap can be defined between the first external surface and the second platen. A second air gap can be defined between the second external surface and the second platen.

According to additional features, the at least one light guiding trough can include a plurality of integrated retaining fasteners that can secure the at least one light guiding trough to the second platen.

According to additional features, the at least one light guiding trough can also include a light transmitting portion and a plurality of framing portions over-molded on the light transmitting portion. The over-molded framing portions can be opaque and can extend at least partially around the first and second faces of the light guiding trough to prevent light leakage. The framing portions can also interconnect the light transmitting portion and the second platen.

According to additional features, the at least one light emitter can be positioned a greater distance from the center of the path than the at least one light detector.

According to other features, the first platen and the second platen can be positioned parallel to each other in a first operational mode. The first platen and the second platen can also be positioned at an angle (being non-parallel) to each other in a maintenance mode. The at least one light trough can be structurally isolated from both the at least one emitter and the at least one detector, whereby the platens are not inhibited from moving relative to one another by the at least one edge sensing apparatus.

BRIEF DESCRIPTION OF THE DRAWINGS

The detailed description set forth below references the following drawings.

DETAILED DESCRIPTION

Figure 8A:
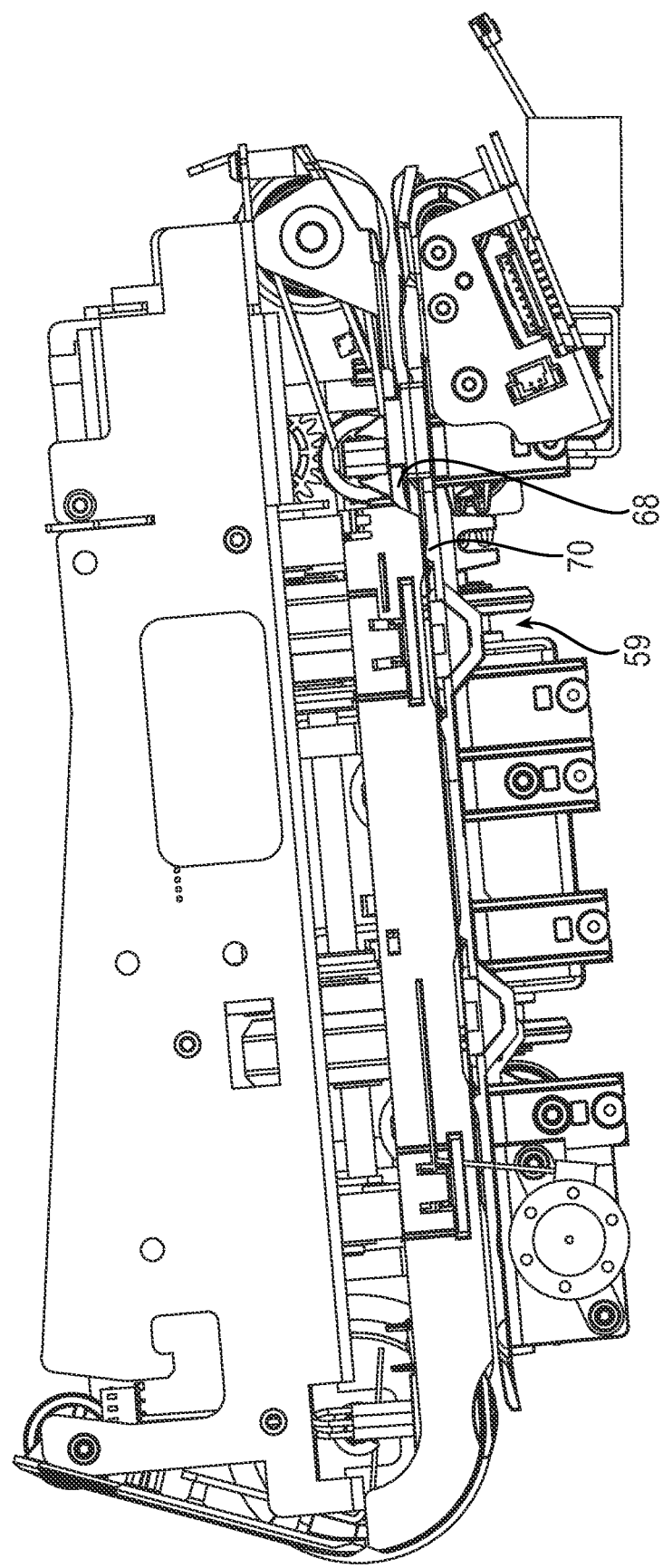
FIG. 8A is a side view of the center and de-skew assembly represented in previous Figures in an operational mode when paper can be moved along the path.
Figure 8B:
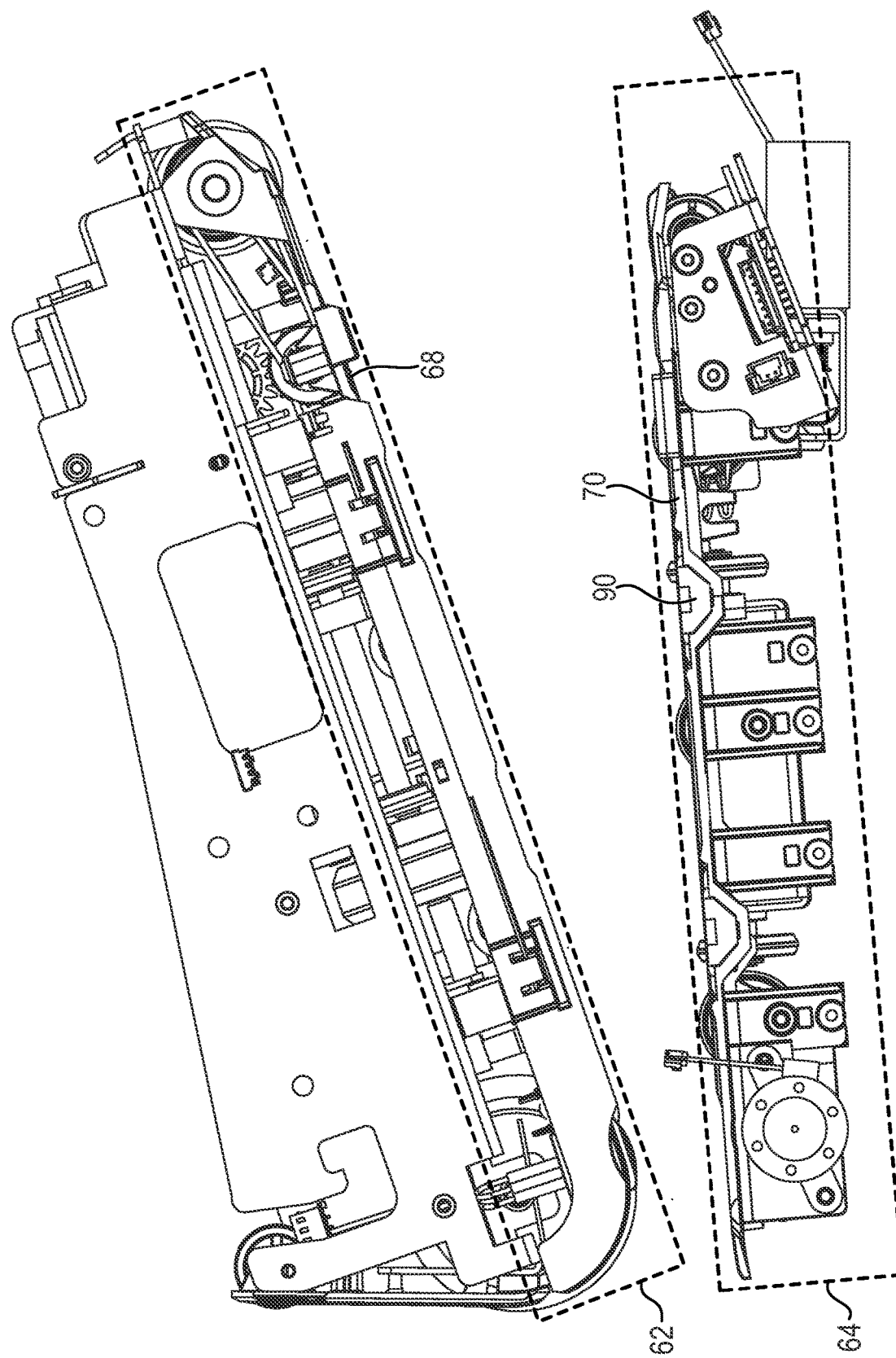
FIG. 8B is a side view of the center and de-skew assembly represented in previous Figures in a maintenance mode.

The present disclosure, as demonstrated by the exemplary embodiment described below, can provide a more reliable edge sensing apparatus for a center and de-skew (CDS) subassembly in an ATM. In an ATM, the CDS subassembly can be desirable for aligning papers such as checks or currency that have been manually deposited by a customer. Aligning the papers can be necessary for reading the magnetic ink character recognition (MICR) lines on deposited checks, which should be aligned with a reader. FIG. 8A shows an exemplary CDS of the present disclosure closed to receive paper, also referred to as the operational mode. Periodically, the CDS subassembly can undergo maintenance, which may require the CDS subassembly to be opened. FIG. 8B shows a CDS of the present disclosure opened, also referred to as the maintenance mode. Upper and lower platens of the CDS subassembly are shown arranged at an angle relative to each other (non-parallel) when the CDS is in maintenance mode. It can be desirable that when the CDS subassembly is opened, there is no risk of mechanical interlocking between the upper and lower platens, which could cause damage.

Figure 1:
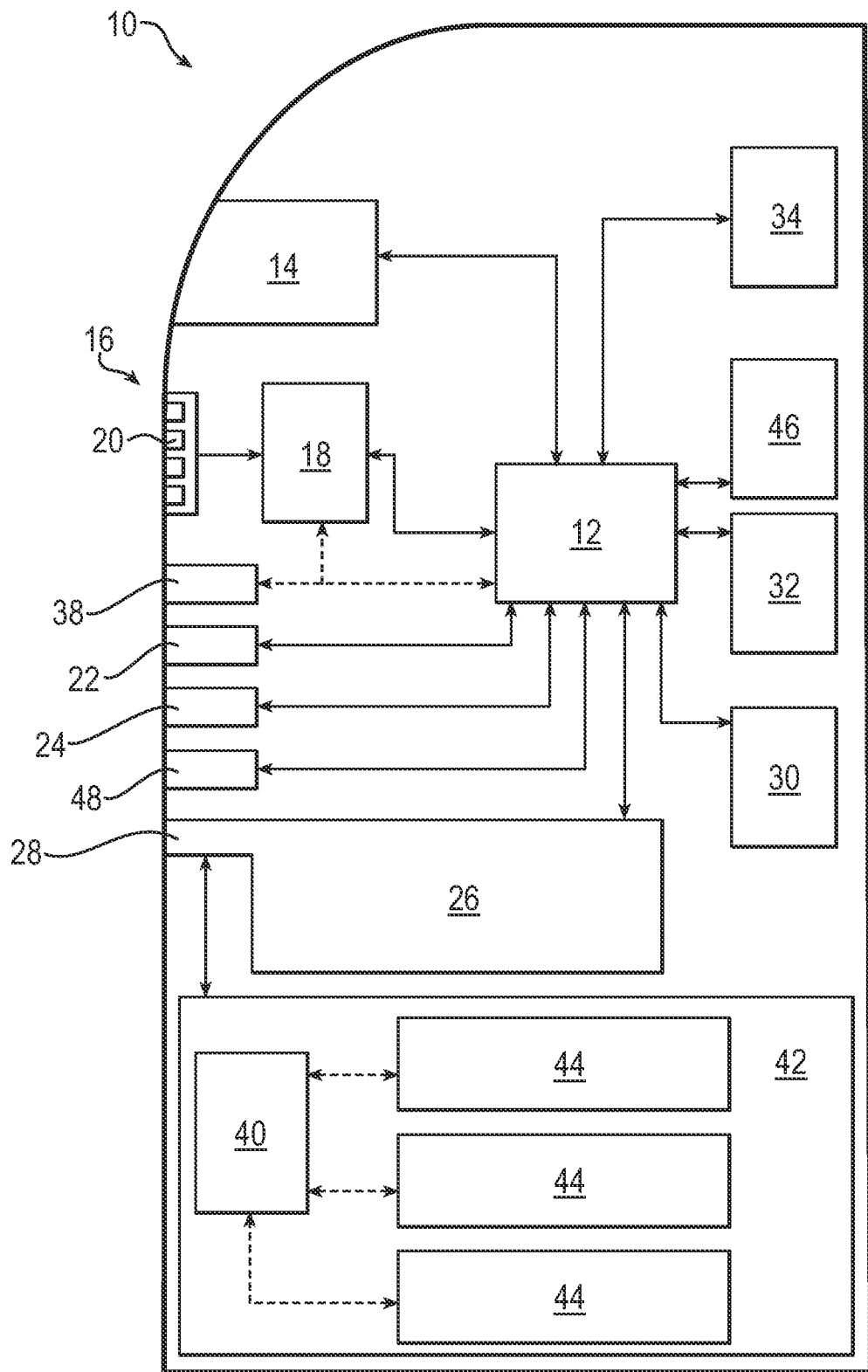
FIG. 1 is a schematic of an ATM.

Referring now to the drawings, FIG. 1 discloses a functional block diagram of an exemplary ATM 10 according to one or more implementations of the present disclosure. The ATM includes different structures and subsystems for receiving input from a user and executing transactions. The ATM 10 includes a computing device 12. The exemplary computing device 12 has one or more processors and a non-transitory, computer readable medium. The computing device 12 operates under the control of an operating system, kernel and/or firmware and executes or otherwise relies upon various computer software applications, components, programs, objects, modules, data structures, etc. The exemplary computing device 12 can operate under the control of the Windows® operating system. The computer readable medium (memory) of the computing device 12 can include random access memory (RAM) devices comprising the main storage of computing device 12, as well as any supplemental levels of memory, e.g., cache memories, non-volatile or backup memories (e.g., programmable or flash memories), read-only memories, etc. In addition, the memory may be considered to include memory storage physically located elsewhere from RAM in the computing device 12, such as any cache memory in a processor, as well as any storage capacity used as a virtual memory. The computing device 12 can also include one or more mass storage devices, e.g., a floppy or other removable disk drive, a hard disk drive, a direct access storage device (DASD), an optical drive (e.g., a CD drive, a DVD drive, etc.), and/or a tape drive, among others, represented by memory 46.

The exemplary ATM 10 also includes a display 14. The computing device 12 can control the display 14 to present information to the user for furthering completion of the transaction. The display 14 can be a touch screen that allows the user to enter information through the display 14. The exemplary display 14 is configured to transmit any user-entered information to the computing device 12.

The exemplary ATM 10 also includes a key pad 16 and an encryption module 18. Generally, the combination of a key pad and an encryption module are referred to in the art as an encrypted pin pad (EPP). The exemplary key pad 16 includes a plurality of keys, such as key 20. The exemplary encryption module 18 has one or more processors and a non-transitory, computer readable medium. The user can press the keys of the key pad 16 to enter a Personal Identification Number (PIN). The key pad 16 is placed in communication with the encryption module 18 and therefore the numbers of the PIN are received by the encryption module 18. It is noted that the communication of the PIN is direct and secure; the PIN cannot be intercepted between the key pad 16 and the encryption module 18. The PIN is then encrypted by the encryption module 18 to define a PIN block. The encryption module 18 includes a network encryption key and applies the network encryption key to encrypt the PIN to the PIN block. The exemplary encryption module 18 is configured to transmit the PIN block to the computing device 12, which can direct the PIN block away from the ATM 10 during the completion of a financial transaction.

The exemplary ATM 10 also includes a card reader 22. The card reader 22 can receive a token from the user, such as a card. The card reader 22 can be configured to execute read and write operations with respect to any storage medium fixed to the user's card. The exemplary card reader 22 can be configured to read data from a magnetic strip on the back of a card or a chip embedded in the card. The exemplary card reader 22 can be configured to transmit any data read from the user's card to the computing device 12, which can direct the data read from the card away from the ATM 10 during completion of a financial transaction. The exemplary card reader 22 can also be configured to receive commands and data from the computing device 12 and change data stored on the user's card.

The exemplary ATM 10 also includes a printer module 24. The computing device 12 can control the printer module 24 to print a receipt when a transaction has been completed. The printer module 24 can communicate one or more messages to the computing device 12, such as a maintenance message regarding the need to refill printer paper.

The exemplary ATM 10 also includes an article exchange unit 26. In the exemplary embodiment, the article exchange unit 26 is configured to receive items such as checks. An exemplary article exchange unit 26 can include a drum on which received items are stored. The exemplary article exchange unit 26 includes a slot 28 open to an exterior of the ATM 10 for the receipt of such items. In other embodiments of the present disclosure, an article exchange unit can be configured to facilitate the receipt of other items, different than paper. The article exchange unit 26 can include one or more sensors and transmit signals from any such sensors to the computing device 12 to execute an exchange. The computing device 12 can control the article exchange unit 26 in response to such signals. For example, the article exchange unit 26 can include a sensor that detects receipt of an item such as a check. The article exchange unit 26 can include a further sensor in the form of a scanner that generates an image of the received item and transmits the image to the computing device 12. When an exchange involves the dispensation of an article to the user, the computing device 12 can control the article exchange unit 26 to dispense the item(s) requested by the user.

The exemplary ATM 10 also includes a printer module 30. The printer module 30 can generate a continuous record of all transactions executed by the ATM 10. The computing device 12 can control the printer module 30 to supplement the record after each transaction has been completed. The printer module 30 can communicate one or more messages to the computing device 12, such as a maintenance message regarding the need to refill printer paper.

The exemplary ATM 10 also includes an access module 32. The access module 32 can be positioned proximate to a rear side of the ATM 10. The access module 32 can be utilized by service and support technicians. For example, the access module 32 can be utilized by a field engineer to complete software updates to the computing device 12. The access module 32 can also be utilized when non-software updates and maintenance is performed, such as the refilling of printer paper or currency.

The exemplary ATM 10 also includes a transceiver 34. The exemplary transceiver 34 is configured to facilitate communication between the computing device 12 and other computing devices that are distinct from and physically remote from the computing device 12. An example of such a remote computing device is a server computing device, such as a banking or financial institution server communicating with a plurality of ATMs. The exemplary transceiver 34 places the computing device 12 in communication with one or more networks, such as network 36. The network 36 can be a local area network (LAN), a wide area network (WAN) such as the Internet, a Multi-protocol label switching (MPLS) network, a cellular network such as operated by cellular phone companies, or any combination thereof. The network 36 can be a financial/bank network such as NYCE, PULSE, PLUS, Cirrus, AFFN, Interac, Interswitch, STAR, LINK, MegaLink, or BancNet. The transceiver 34 can transmit data and requests for input generated by the computing device 12 and receive responses to these requests, directing these responses to the computing device 12.

The exemplary ATM 10 also includes a transceiver 38. The exemplary transceiver 38 is configured to facilitate communication between at least one of the encryption module 18 and the computing device 12 and other computing devices that are distinct from and physically proximate to the ATM 10. An example of such a proximate computing device is a smartphone possessed by the user. The dashed connection lines in FIG. 1 represent optional interconnections. The exemplary transceiver 38 can place the user's smartphone in communication with the encryption module 18, the computing device 12, or both. The exemplary transceiver 38 can implement various communication protocols. For example, the transceiver 38 can be a Near Field Communication (NFC) device. Alternatively, the transceiver 38 can be a Bluetooth beacon. The transceiver 38 can transmit and receive data and requests for input generated by the encryption module 18 and/or the computing device 12, such transmissions occurring with the user's smart phone for example.

The exemplary ATM 10 also includes an advanced function dispenser (AFD) 40. The AFD 40 can dispense banknotes, such as currency. The exemplary AFD 40 is positioned in a safe 42. One or more cassettes or cash boxes 44 are also positioned and protected in the safe 42. Banknotes are stored in the cassettes 44 for disbursement to a user of the ATM 10. The exemplary AFD 40 can extract the banknotes from one or more of the cassettes 44 and direct them out of the ATM 10 through the slot 28. The AFD 40 thus communicates with the slot 28 in parallel with the article exchange unit 26. The exemplary AFD 40 can communicate with and be controlled by the computing device 12 for at least some operations. Each of the cassettes 44 can engage the AFD 40 through a rack whereby the positioning of the cassettes is controlled. Further, the each of the cassettes 44 and the AFD 40 can include mating connectors of any form, whereby a positive interconnection is confirmed electronically. When one or more of the cassettes 44 and the AFD 40 are not properly interconnected, a signal or lack thereof can be communicated to the computing device 12 whereby an error message is generated or the ATM 10 can be disabled.

The exemplary ATM 10 also includes a scanner 48. The scanner 48 can scan, for example, at least a portion of a display of a smart phone and communicate the scanned display to the computing device 12. A token can be displayed on the display of the smart phone and thus scanned by the scanner 48. The token can be a bar code, a quick response (QR) code, a number, a string of alphanumeric characters, a weblink, or some other symbolic indicia. The exemplary scanner 48 is configured to transmit any scanned data to the computing device 12, which can direct the scanned away from the ATM 10 during completion of a financial transaction.

Figure 2:
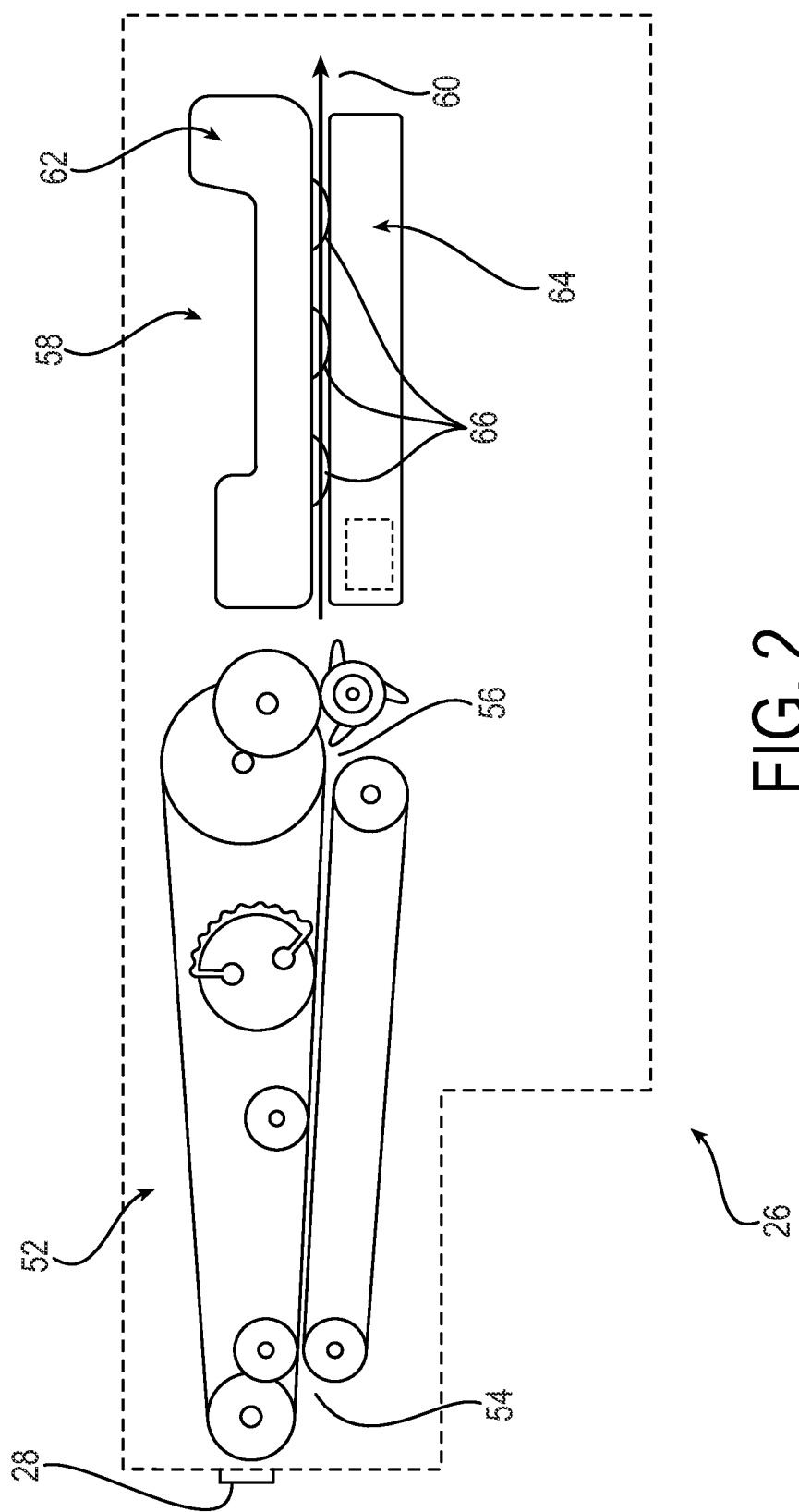
FIG. 2 is a schematic of a portion of the ATM showing a center and de-skew assembly.

As illustrated in FIG. 2, the article exchange unit 26 can include a transport subassembly 52. The exemplary transport subassembly 52 is similar to the transport subassembly 46 disclosed in U.S. application Ser. No. 15/750,723, which is hereby incorporated by reference. Transport subassembly 52 extends in generally a straight path from the slot 28 to an outlet 56. An inlet 54 of the transport subassembly 52 can be positioned adjacent to the slot 28. The transport subassembly 52 can include a plurality of belts or other moving members to move papers received from a user of the ATM 10. If a deposited item is skewed or is not centered, it will pass through the transport subassembly 52 in skewed or non-centered state in the exemplary embodiment of the present disclosure.

Papers received at the transport subassembly 52 can then be passed to the right (based on the perspective of FIG. 2) to a CDS subassembly 58 of the article exchange unit 26. The CDS subassembly 58 can center papers received from the transport subassembly 52. The CDS subassembly 58 can define a path 60 along which the papers are moved. The arrow referenced at 61 is the direction away from the transport subassembly 52. The CDS subassembly 58 includes an exemplary upper portion that is positioned on a first side 62 of the path 60 and that defines an upper boundary of the path 60. The CDS subassembly 58 also includes an exemplary lower portion that is positioned on a second side 64 of the path 60 and that defines an lower boundary of the path 60. The CDS subassembly 58 can include CDS transport rollers 66 configured to move papers along the path 60.

Figure 3A:
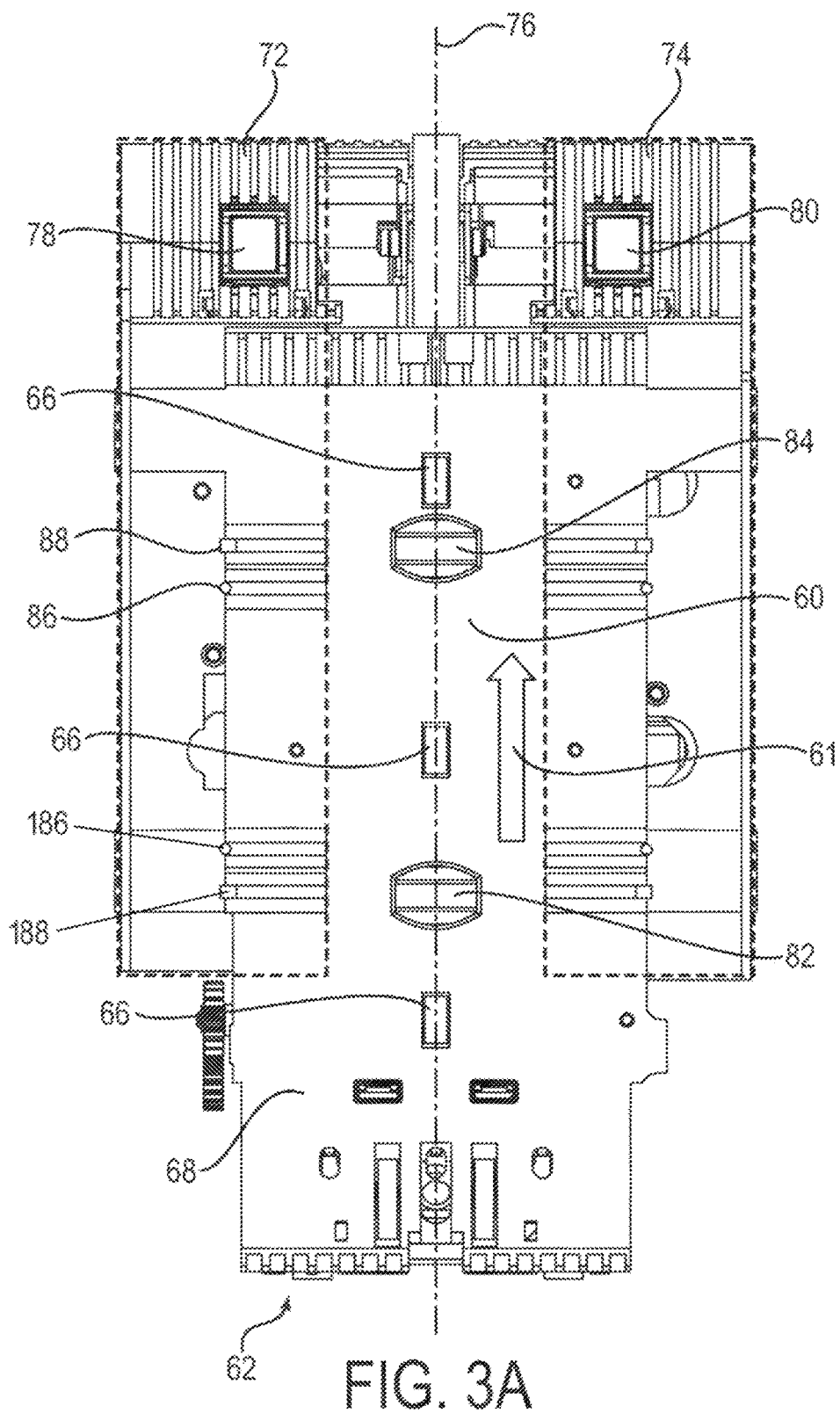
FIG. 3A is a view of a first portion of the center and de-skew assembly represented in FIG. 2 that defines a first or upper side of a path for directing paper in the ATM.
Figure 3B:
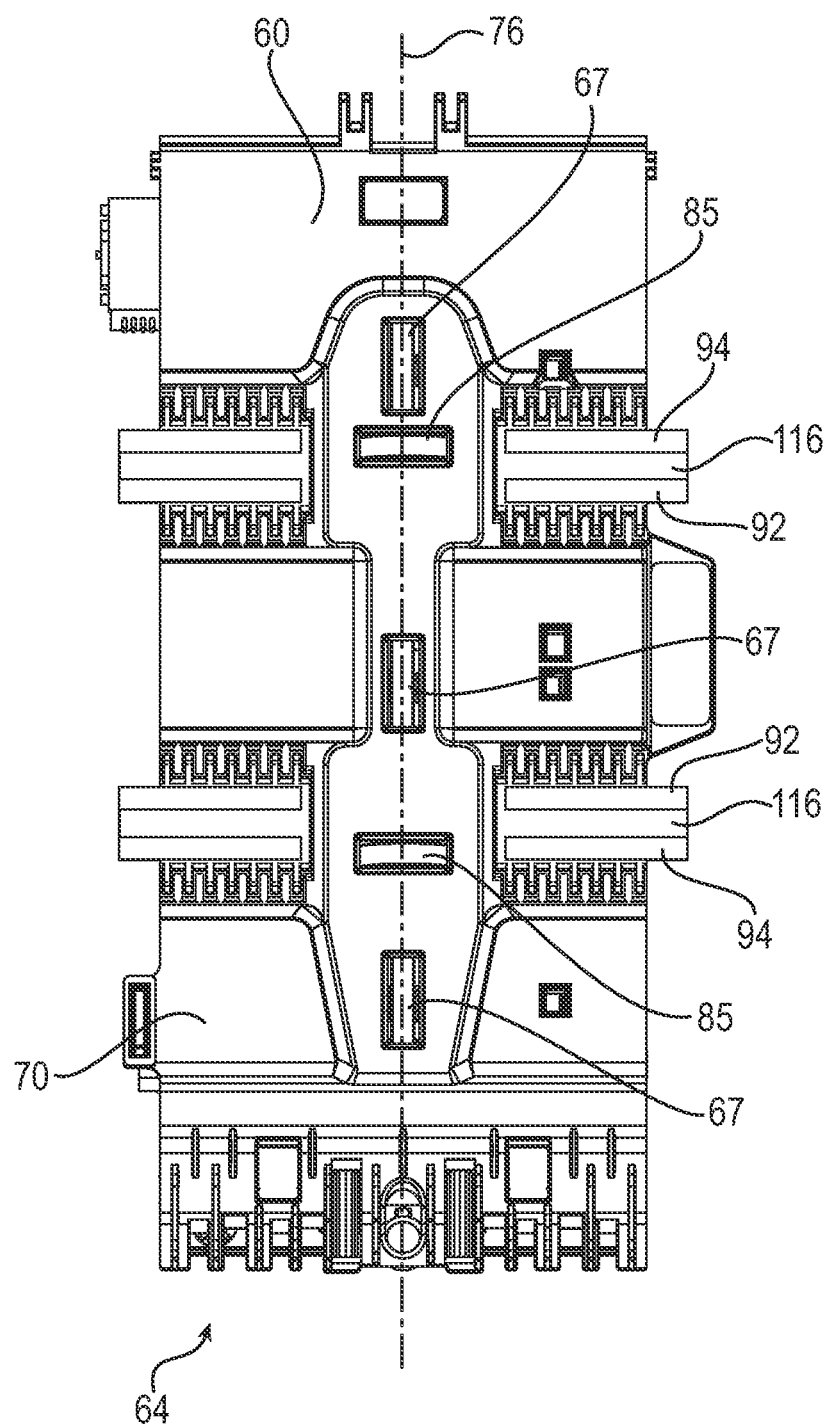
FIG. 3B is a view of a second portion of the center and de-skew assembly represented in FIG. 2 that defines a second or lower side of the path for directing paper in the ATM.

FIG. 3A is an upward-looking view of the exemplary upper portion of the CDS subassembly 58 from the perspective of the path 60. FIG. 3A is looking toward the first side 62 of the path 60. FIG. 3B is a downward-looking view of the exemplary lower portion of the CDS subassembly 58 from the perspective of the path 60. FIG. 3B is looking toward the second side 64 of the path 60.

A first platen 68 is part of the exemplary upper portion of the CDS subassembly 58 and can define the boundary of the path 60 on the first side 62. A second platen 70 is part of the exemplary lower portion of the CDS subassembly 58 and can define the boundary of the path 60 on the second side 62. FIG. 3A shows a first plate 72 and a second plate 74 mounted on the first platen 68 in the exemplary embodiment, with dashed lines indicating the approximate location of plates 72, 74 which can be mounted above first platen 68. The exemplary plates 72, 74 can be moveable away from and toward a central axis 76 of the path 60. The rollers 66 can extend into the gap between said first platen 68 and second platen 70 to engage the paper and move the paper along path 60. The rollers 66 can be powered by a motor 65 and be positioned to pinch paper against idler rollers that are mounted to the second platen 68. A first MICR sensor 78 and a second MICR sensor 80 can be mounted on the first and second plates 72 and 74, respectively. Also shown in FIG. 3A is front wheel 82 and rear wheel 84 for engaging the paper and moving the paper in a direction transverse to path 60. A control circuit 55 is shown in FIG. 3A that can be in communication with motors 81, 83 which can be configured to move the front wheel 82 and rear wheel 84, respectively. The control circuit 55 can also be in communication with the motor 65 which can be configured to move the rollers 66.

The CDS subassembly 58 can include a sensing apparatus 59 for detecting an edge of a paper. The sensing apparatus 59 can include a light emitter 86, a light detector 88, a control circuit 55, and a light guiding trough 90.

FIG. 3A also shows that the light emitter 86 can be positioned along the path 60 of movement of the paper, on the first side 62. The light emitter 86 can emit light across the path 60 to the second side 64 of the path 60, which can be opposite of first side 62. The light detector 88 can be positioned along the path 60 on the first side 62 with the light emitter 86. The light detector 88 can be configured to detect light and emit a signal that corresponds to an amount of detected light. The control circuit 55 can be configured to control a flow of power to the light emitter 86 and to receive the signal emitted by the light detector 88. In one or more embodiments of the present disclosure, the control circuit 55 can be part of the computing device 12. In one or more embodiments of the present disclosure, the control circuit 55 can be distinct from the computing device 12, communicate data with the computing device 12, and receive commands from the computing device 12 and execute such commands. As is also shown in FIG. 3A, the sensing apparatus 59 also includes a second light emitter 186 and second light detector 188 mounted on the plate 72. FIG. 3A also shows the first light emitter 86 and the second light emitter 186 are adjacent to one another along the path 60 are positioned between the first and second light detectors 88 and 188.

The light guiding trough 90 can be positioned on the second side 64 of the path 60. The light guiding trough 90 can have first face 92 and second face 94, and each of the faces 92 and 94 can face the path 60. The first face 92 can be positioned to confront light emitter 86 and thereby receive light emitted by light emitter 86, and the second face 94 can be positioned to confront the light detector 88 and can thereby emit light toward the light detector 88.

The first face 92 and the second face 94 can each be of a rectangular shape, having, respectively, a short axis 93, 95 and a long axis 97, 99. The long axes 97, 99 of the first face 92 and the second face 94 can be transverse to the direction of movement of the paper along the path 60. The long axes 97, 99 of the first face 92 and the second face 94 can be coplanar.

The light emitter 86 can be positioned at a greater distance from the central axis 76 than light detector 88, as shown in FIG. 3A. Thus, the light emitter 86 and the light detector 88 can be offset from each other in a direction transverse to the path 60 of movement of the paper. The light emitter 86 and light detector 88 can be spaced from one another along the path 60. In operation, when a paper moving along the path 60 is not skewed, the light emitter 86 can be spaced from an edge of the paper and thus not blocked. At the same time, when a paper moving along the path is not skewed, the light detector 88 can be positioned such that the edge of the paper partially blocks the detecting surface of the light detector. The light detector 88 can be positioned such that an edge of a non-skewed paper passes over a center of the detection surface of the light detector 88. It has been found that this positioning can improve accuracy in determining the edge location and reduce errors in the reading of the data generated by the light detector 88. Exemplary wheel idlers 85 and exemplary roller idlers 67 can be mounted on second platen 70 at the locations shown.

Figure 4:
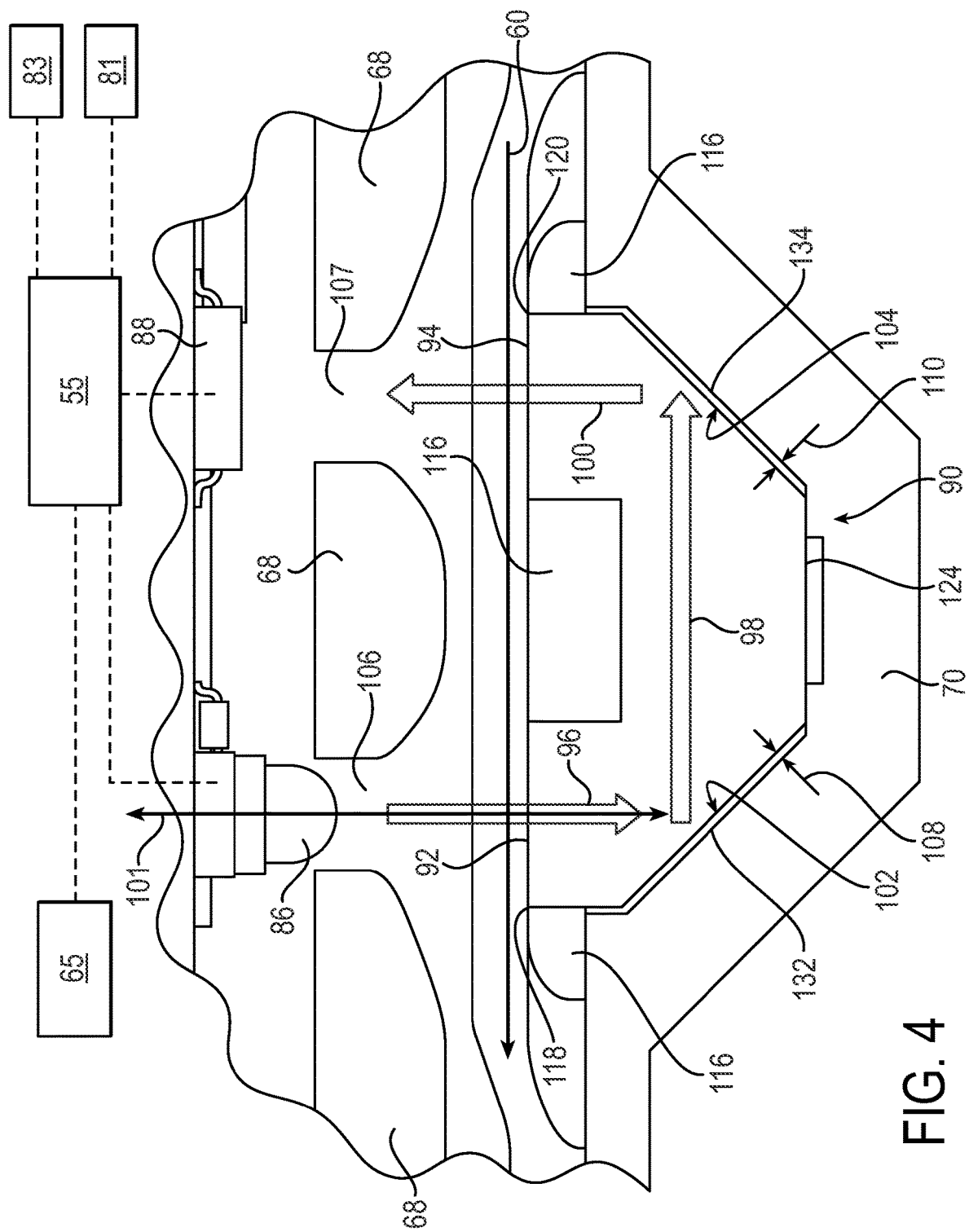
FIG. 4 is a side view of an exemplary embodiment of an edge sensing apparatus as incorporated in the center and de-skew subassembly shown in FIGS. 2, 3A and 3B.

In FIG. 4, a control circuit 55 is shown in communication with the emitter 86, detector 88, the motors 81 and 83 that drive the wheels 82 and 84, and the motor 65 that drives the wheels 66. The control circuit 55 can control a flow of power to the light emitter 86 and can receive the signal emitted by the light detector 88. The control circuit 55 can also control a flow of power to the motors 65, 81, 83 in response to signals received by the light detector 88. FIG. 4 also shows that the light emitter 86 can emit a field of light centered on a primary light axis 101 that can be transverse to the path 60. The light guiding trough 90 can be positioned on the second side 64 of path 60 and can include a first external surface 132. The first external surface 132 can define a first internal reflective plane 102 inside the light guiding trough 90. Likewise, light guiding trough 90 can include a second external surface 134, which can define a second internal reflective plane 104 inside light guiding trough 90.

FIG. 4 also shows the propagation of the light through the light guiding trough 90. Light emitted from the light emitter 86 can project in a first direction 96 along the primary light axis 101 through an aperture 106 in a first platen 68 from the first side 62 of the path 60 to the second side 64 into the first face 92 of light guiding trough 90. The light can then reflect off of the first internal reflective plane 102 in a second direction 98 toward the second internal reflective plane 104. The light can then reflect off of the second internal reflective plane 104 in a third direction 100 toward the second face 94 and can then exit the light guiding trough 90 through second face 94 toward light detector 88 through an aperture 107. The first external surface 132 and the second external surface 134 can be spaced from one another along the path 60, whereby the second direction 98 can also be along the path 60. The second direction 98 can be opposite to the direction of movement of paper along the path 60 or can be the same as the direction of movement of paper along the path 60.

First and second air gaps 108 and 110 respectively can be positioned between the reflective planes 102 and 104 and the second platen 70. These air gaps 108, 110 can improve the efficiency of the transmission of light within the light guiding trough 90. For example, the air gaps 108, 110 increase the likelihood that more light will be directed through the trough 90 rather than escaping from the trough 90 through the planes 102, 104.

Figure 5:
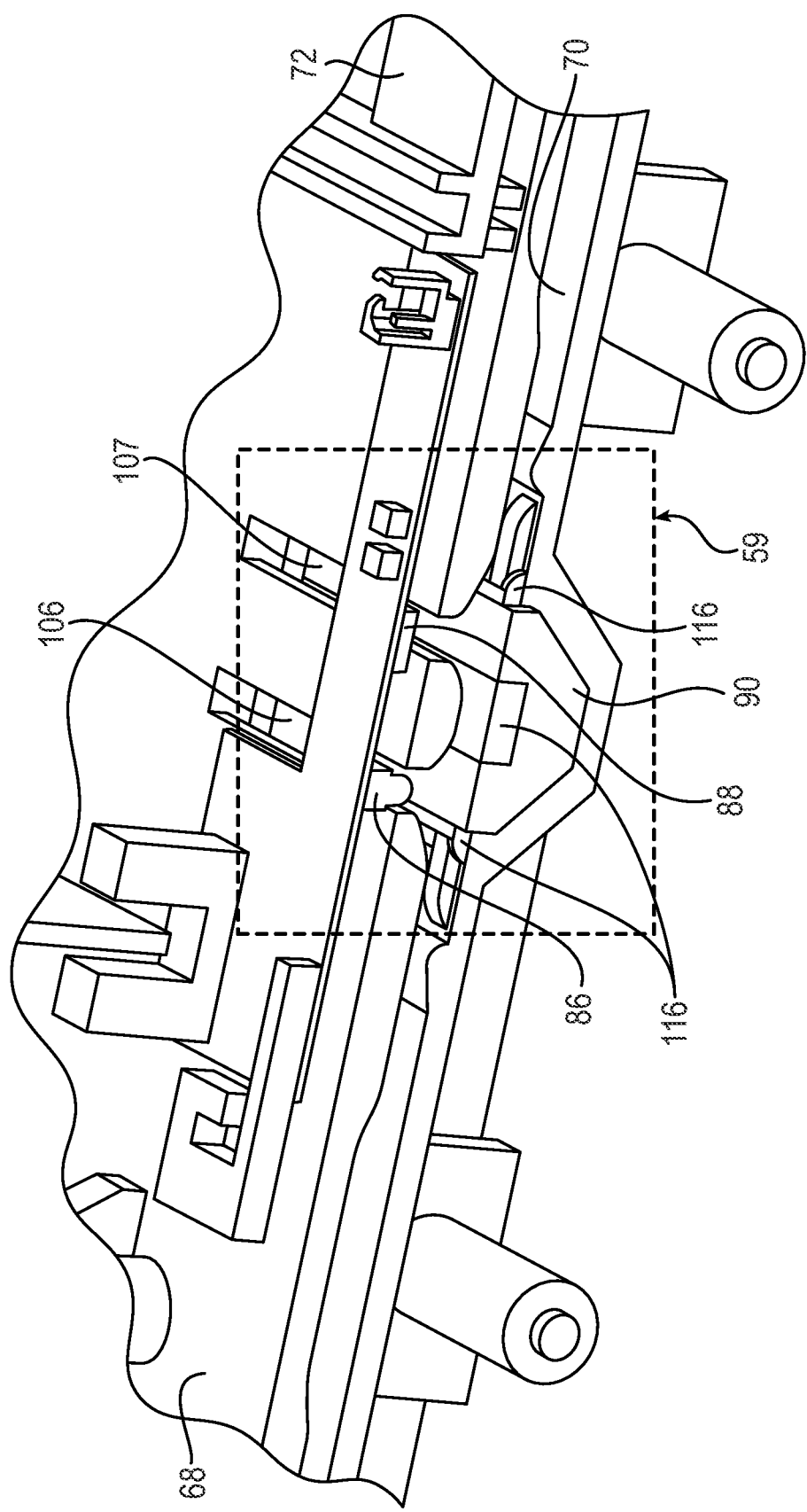
FIG. 5 is a perspective view of the structures shown in FIG. 4, with a box in dash line indicating the structures displayed in FIG. 4.

FIG. 5 shows a perspective view of how the light emitter 86 and the detector 88 are mounted in a fixed fashion on a first plate 72. The first plate 72 can move toward the central axis of the path 76 such that light emitter 86 and detector 88 move across the apertures 106, 107 in first platen 68 and along light guiding trough 90. The apertures 106, 107 allow the transmission of light from emitter 86 through light guiding trough 90 and into detector 88, unless the light path is blocked by the edge of a paper located in the path 60 between first platen 68 and second platen 70.

Figure 6A:
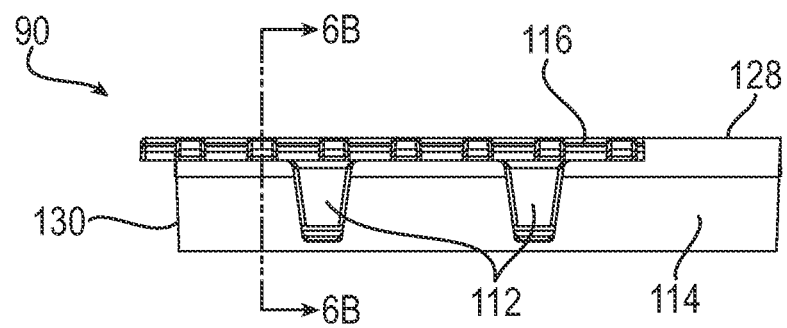
FIG. 6A is a side view of an exemplary embodiment of a light guiding trough as used in an edge sensing apparatus.
Figure 6B:
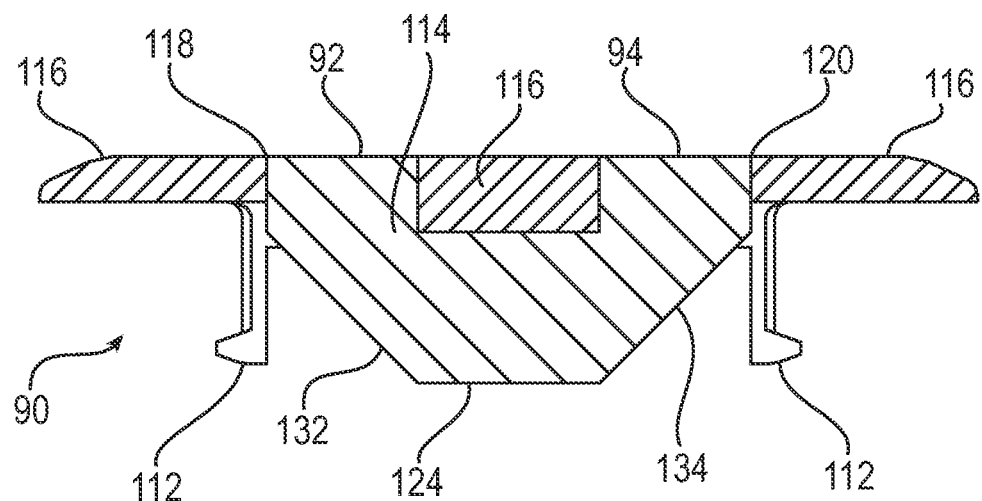
FIG. 6B is a cross-section through section lines 6B-6B in FIG. 6A.
Figure 7A:
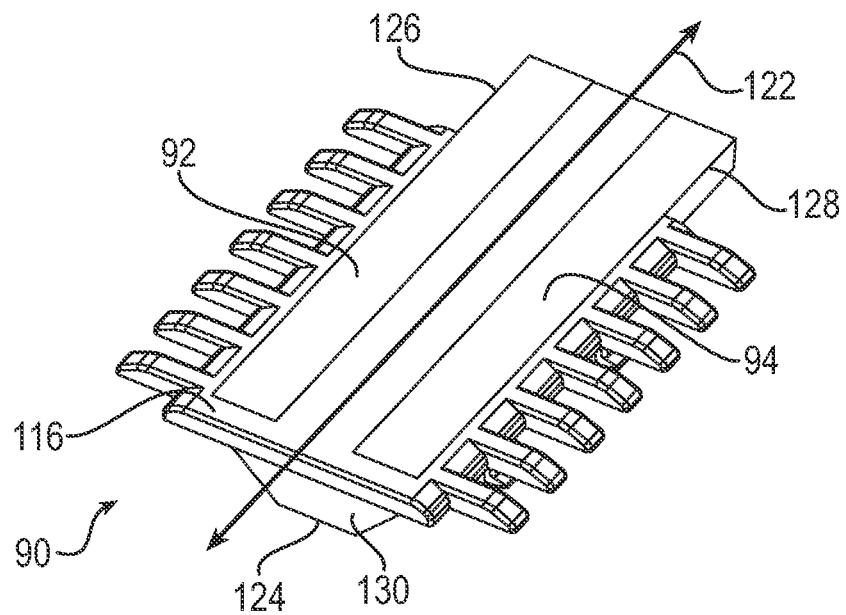
FIG. 7A is a perspective view of the exemplary light guiding trough shown in FIGS. 6A and 6B.
Figure 7B:
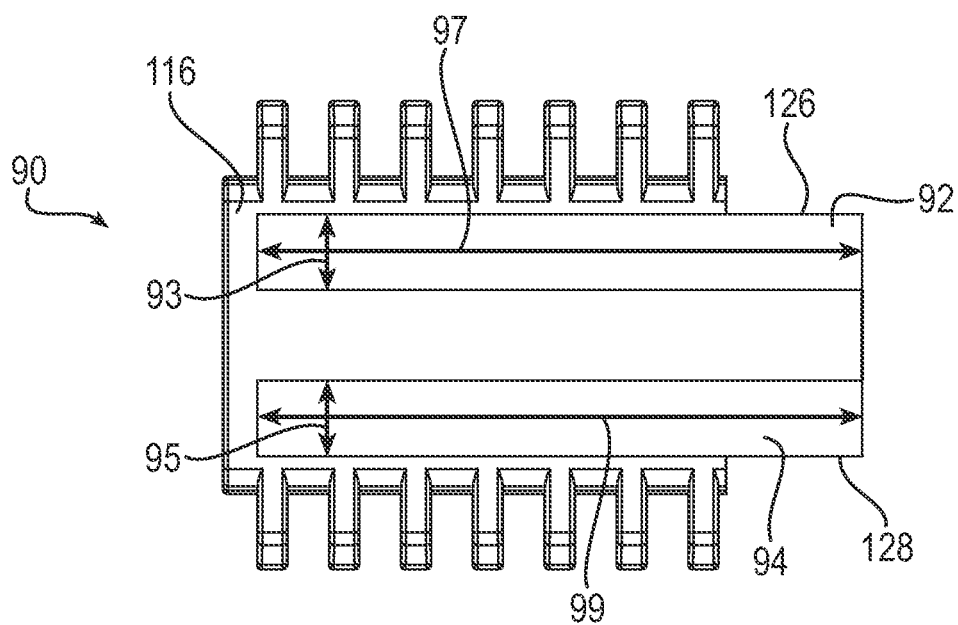
FIG. 7B is a top view of the exemplary light guiding trough shown in FIGS. 6A, 6B and 7A.

FIG. 6A is a side view of light guiding trough 90 and FIG. 6B is an end view of light guiding trough 90. The exemplary light guiding trough is fixedly attached to an over-mold portion 116. The over-mold portion 116 defines retaining fasteners 112 used to mount the light guiding trough 90. The retaining fasteners 112 can interconnect the light guiding trough 90 to the second platen 70. A light transmitting portion 114 of the light guiding trough 90 can be optically transparent and can be the operative portion for the guiding of light from the light emitter 86. The over-mold portion 116 can be opaque and typically black and serves as a framing portion for the first and second faces 92 and 94 respectively, as shown in FIGS. 7A and 7B to prevent light leakage and potentially causing erroneous readings by the light detector 88.

The exemplary light guiding trough 90 has a two-dimensional truncated vee-shape in a first plane. The first plane is the plane of view of FIG. 6B. This first plane can be generally perpendicular to the gap between the platens 68, 70; the exemplary path 60 is defined in the gap between the platens 68, 70. The truncated vee-shape can have a first end 118, a second end 120 and a linear truncated end 124. The light guiding trough 90 can be further spatially defined by the truncated vee-shape extending along a trough axis 122, which can be normal to the first plane that defines the two-dimensional truncated vee-shape. This extension can result in the creation of a three-dimensional truncated vee-shaped volume that can have a first linear end 126, a second linear end 128, and a planar truncated end 130, which can be seen in FIG. 7A. In the resulting three-dimensional shape of the light guiding trough 90, the first face 92 can be bounded on one side by the first linear end 126 and said second face 94 can be bounded on one side by second linear end 128 of the light guiding trough 90.

The light guiding trough 90 can be thus configured such that light received by said first face 92 in the first direction 96 at a point along said trough axis 122, can be reflected internally in the second direction 98 across the planar truncated end 130, and can be emitted in the third direction 100 from the second face 94 at the same point along the trough axis 122.

FIG. 8A shows the platens 68, 70 in a closed and operation configuration. FIG. 8B show the platens 68, 70 in an open and maintenance position. In FIG. 8A, the first platen 68 can be parallel to second platen 70. In FIG. 8B, the first platen 68 can be at a non-zero angle to the second platen 70. The light emitters 86 and light detectors 88 can be mounted on the first plate 72 on the first platen 68. Across from first platen 68, the light guiding troughs 90 can be mounted to the second platen 70 so that the emitters 86 and detectors 88 can be thus structurally isolated from the light guiding troughs 90. This can allow the platens 68 and 70 to be uninhibited from moving relative to each other at least with respect to the edge sensing apparatus 59.

Figure 9:
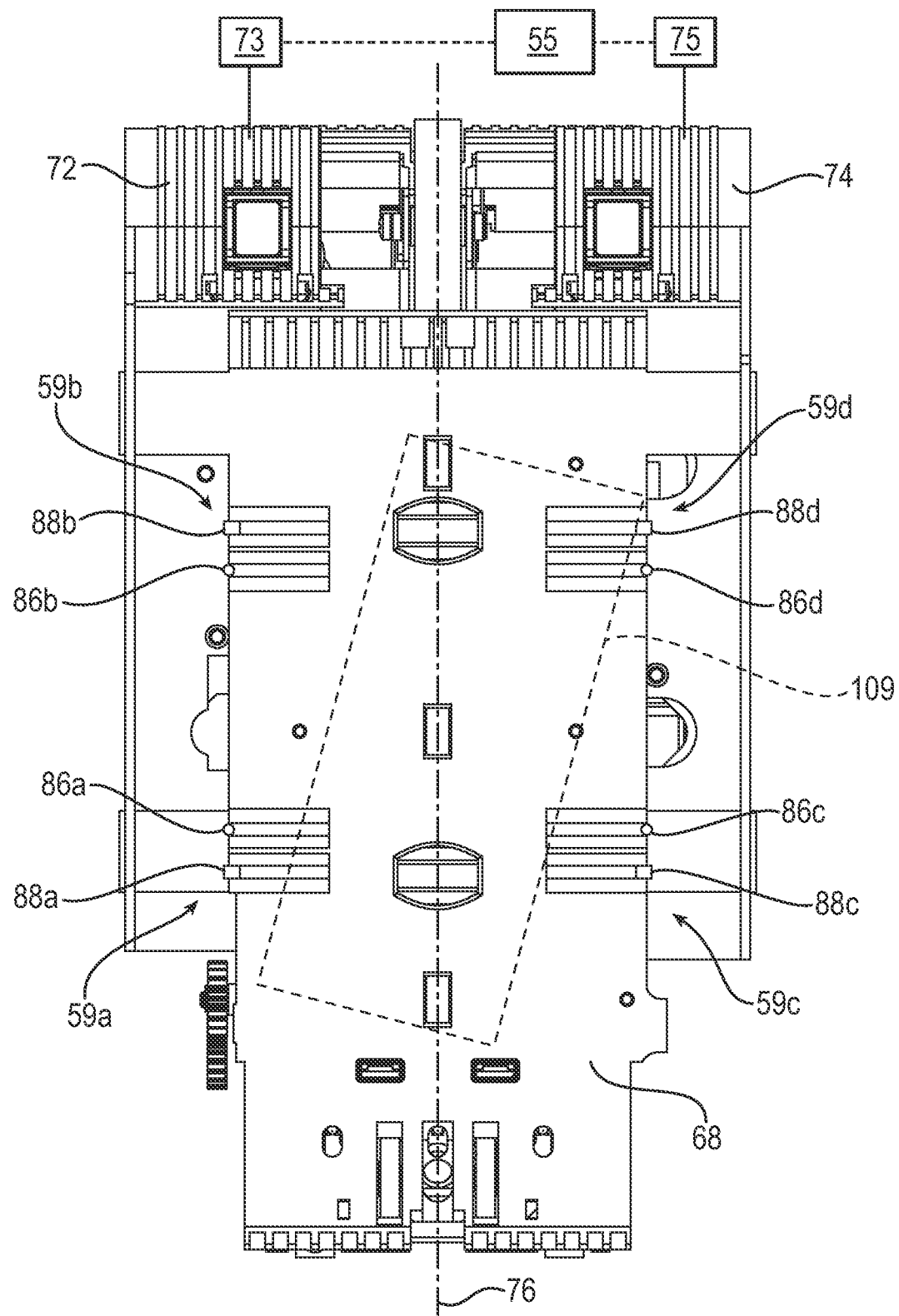
FIG. 9 is a first view of a paper on the path in the center and de-skew assembly wherein the paper is skewed.

FIGS. 9-12 are sequential views of the exemplary embodiment during a de-skewing operation. FIG. 9 is a first illustration of the sequence. FIG. 9 shows a paper 109 skewed on the path 60; paper 109 is not centered on the central axis 76 of the path 60. The exemplary control circuit will have determined that the paper 109 is skewed based on signals received from four exemplary edge sensing apparatuses 59a-59d. The signals emitted by the exemplary edge sensing apparatuses 59a-59d, in response to the condition shown in FIG. 9, are processed by the control circuit 55 to indicate that the paper 109 is skewed. In exemplary FIG. 9, none of the exemplary edge sensing apparatuses 59a-59d detects an edge of the paper 109. None of the respective light detectors 88a-88d detects an edge of the paper 109. FIG. 9 shows respective first end limits of the travel of the plates 72, 74.

Figure 10:
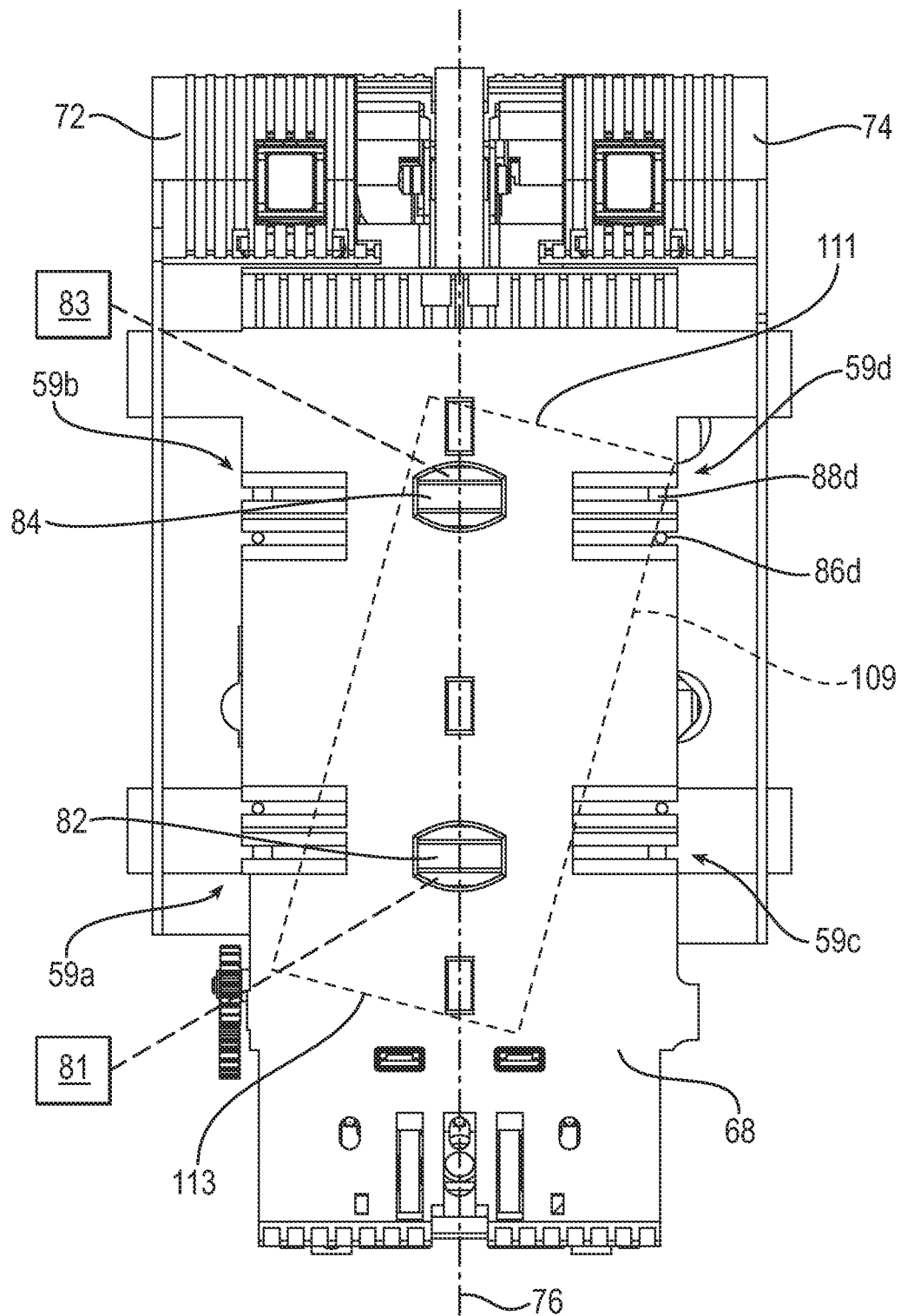
FIG. 10 is a second view of the paper on the path in the center and de-skew assembly, after FIG. 9, with plates of the center and de-skew assembly moved slightly toward a center of the path and an upper right light detector of an edge sensing apparatus blocked.

FIG. 10 is a second illustration of the sequence. During the interval between the conditions illustrated in exemplary FIGS. 9 and 10, the control circuit 55 has controlled the motors 73, 75 to activate and move the plates 72, 74 toward the central axis 76. The control circuit 55 can continuously receive signals from the light detectors 88a-88d during movement of the plates 72, 74, analyze signals, and issue commands in response to the signals.

In response to the conditions shown in FIG. 10, the light detector 88d of the edge sensing apparatus 59d will have begun to emit a signal indicating that the light detector 88d is blocked and not receiving light. The light detectors 88a-88c will be emitting respective signals indicating that the light detectors 88a-88c are not blocked and are receiving light. In response to these sensed conditions, the control circuit 55 can initiate one or more actions. For example, the control circuit 55 can control the motor 83 to activate and rotate the wheel 84 in a direction of rotation whereby a first end 111 of the paper 109 is moved toward the edge sensing apparatus 59b, to be centered on the central axis 76. In addition or alternatively, the control circuit 55 can control the motor 81 to activate and rotate the wheel 82 in a direction of rotation whereby a second end 113 of the paper 109 is moved toward the edge sensing apparatus 59c, to be centered on the central axis 76. In addition or alternatively, the control circuit 55 can control the motors 73, 75 to cease movement of the plates 72, 74 as the paper 109 is at least partially de-skewed.

Figure 11:
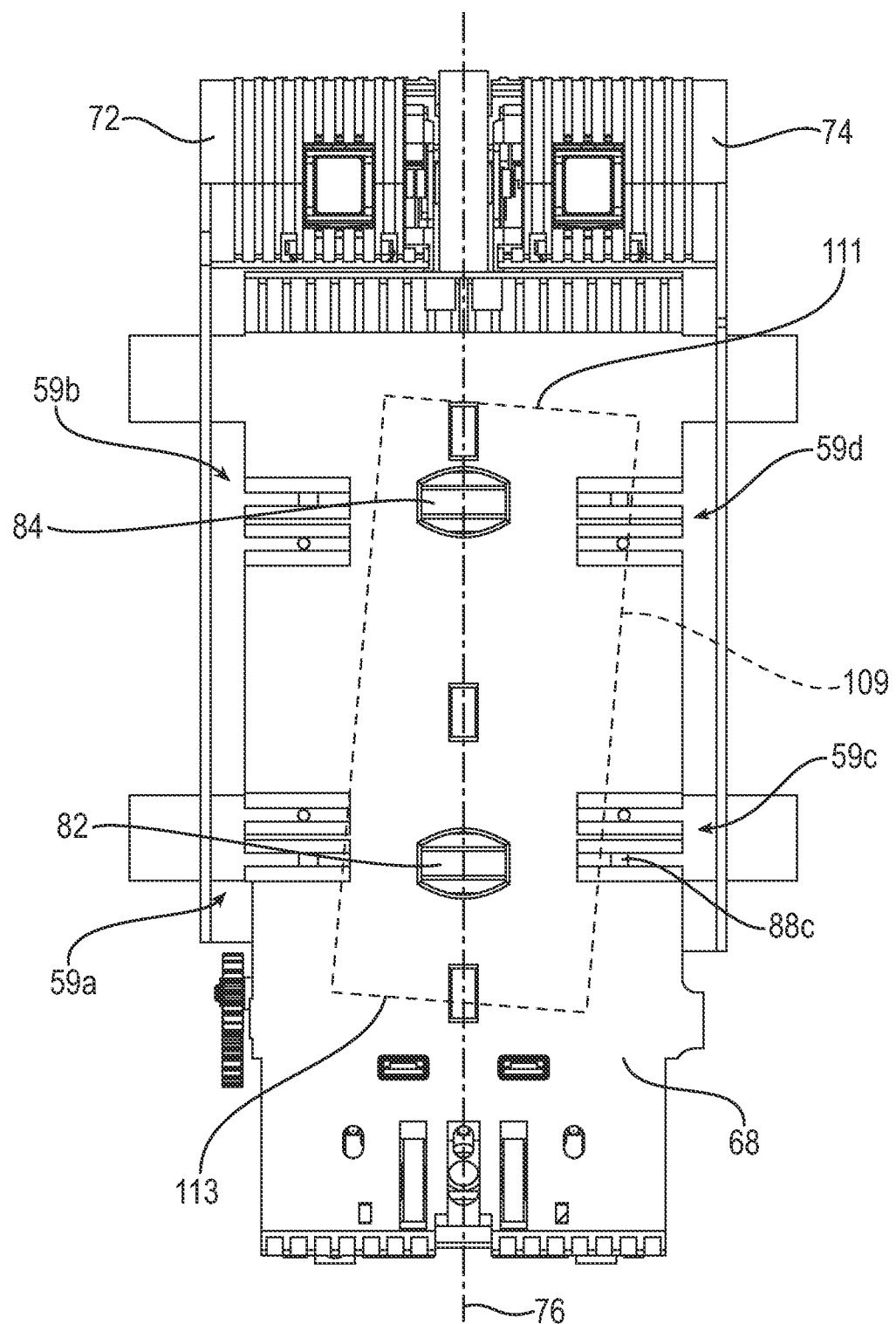
FIG. 11 is a third view of the paper on the path, after FIG. 10, wherein a front wheel of the center and de-skew assembly has rotated and moved a top portion of the paper (based on the perspective of FIG. 11) to the left to reduce the skewing as both plates have moved more towards the center of the path.

FIG. 11 is a third illustration of the sequence. During the interval between the conditions illustrated in the exemplary FIGS. 10 and 11, the paper 109 was partially de-skewed whereby the edge sensing apparatuses 59a-59d emitted signals indicating that none of the light detectors 88a-88d was blocked. Further, during the interval between the conditions illustrated in the exemplary FIGS. 10 and 11, the control circuit 55 controlled the motors 73, 75 to reactivate and move the plates 72, 74 further toward the central axis 76. In response to the conditions shown in FIG. 11, the light detector 88d of the edge sensing apparatus 59d will have begun to emit a signal indicating that the light detector 88d is blocked and not receiving light. The light detectors 88a, 88b will be emitting respective signals indicating that the light detectors 88a, 88b are not blocked and are receiving light. The light detector 88c will be emitting a signal indicating that an edge of the paper 109 is detected. In response to these sensed conditions, the control circuit 55 can initiate one or more actions. For example, the control circuit 55 can control the motor 83 to activate and rotate the wheel 84 in a direction of rotation whereby the first end 111 of the paper 109 is moved further toward the edge sensing apparatus 59b, to be centered on the central axis 76. In addition or alternatively, the control circuit 55 can control the motor 81 to activate and rotate the wheel 82 in a direction of rotation whereby the second end 113 of the paper 109 is moved toward the edge sensing apparatus 59c, to be centered on the central axis 76. In addition or alternatively, the control circuit 55 can control the motors 73, 75 to cease movement of the plates 72, 74 as the paper 109 is at least partially de-skewed.

The control circuit 55 can control the motors 73, 75, 81, 83 in various ways in response to signals from the light detectors 88a-88d of the exemplary edge sensing apparatuses 59a-59d. For example, the motors 73, 75 may be disengaged or may merely be slowed when motors 81 and/or 83 are engaged. After at least one of the edge sensing apparatuses 59a-59d is blocked or detects an edge of the paper 109, the motors 81 and/or 83 can be engaged until none of the edge sensing apparatuses 59a-59d is blocked or detects an edge of the paper 109. The motors 73, 75 can then be reengaged until one of the is blocked or detects an edge of the paper 109 and the motors 81 and/or 83 can be reengaged.

Figure 12:
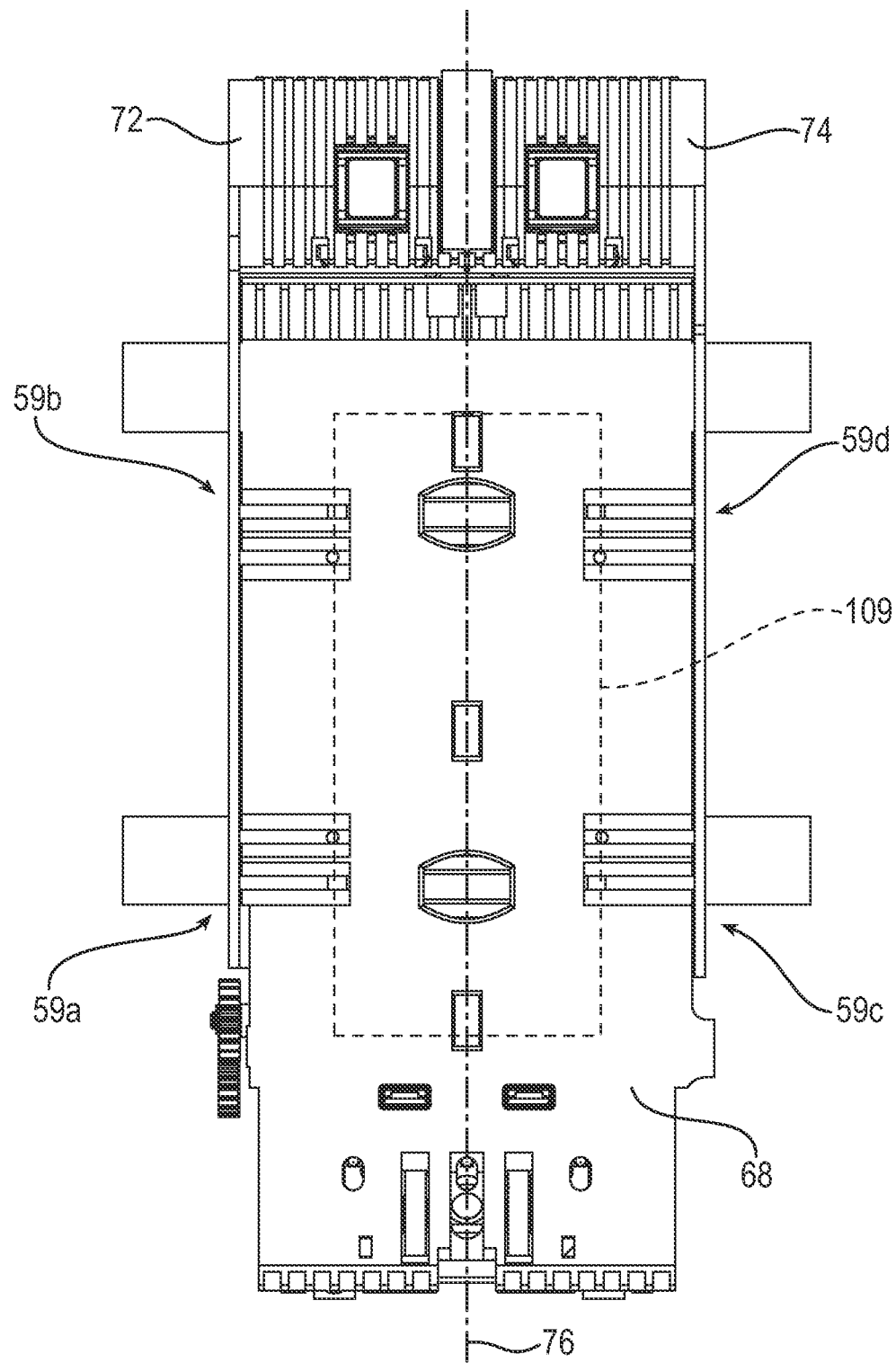
FIG. 12 is a fourth view of the paper on the path, after FIG. 11, wherein the paper has been centered on the center of the path.

FIG. 12 is a fourth illustration of the sequence. During the interval between the conditions illustrated in the exemplary FIGS. 11 and 12, the paper 109 was fully de-skewed whereby the edge sensing apparatuses 59a-59d now emit signals indicating that all of the light detectors 88a-88d detect an edge of the paper 109. Further, during the interval between the conditions illustrated in the exemplary FIGS. 10 and 11, the control circuit 55 controlled the motors 73, 75 to move the plates 72, 74 further toward the central axis 76. FIG. 12 shows respective second end limits of the travel of the plates 72, 74.

Figure 13:
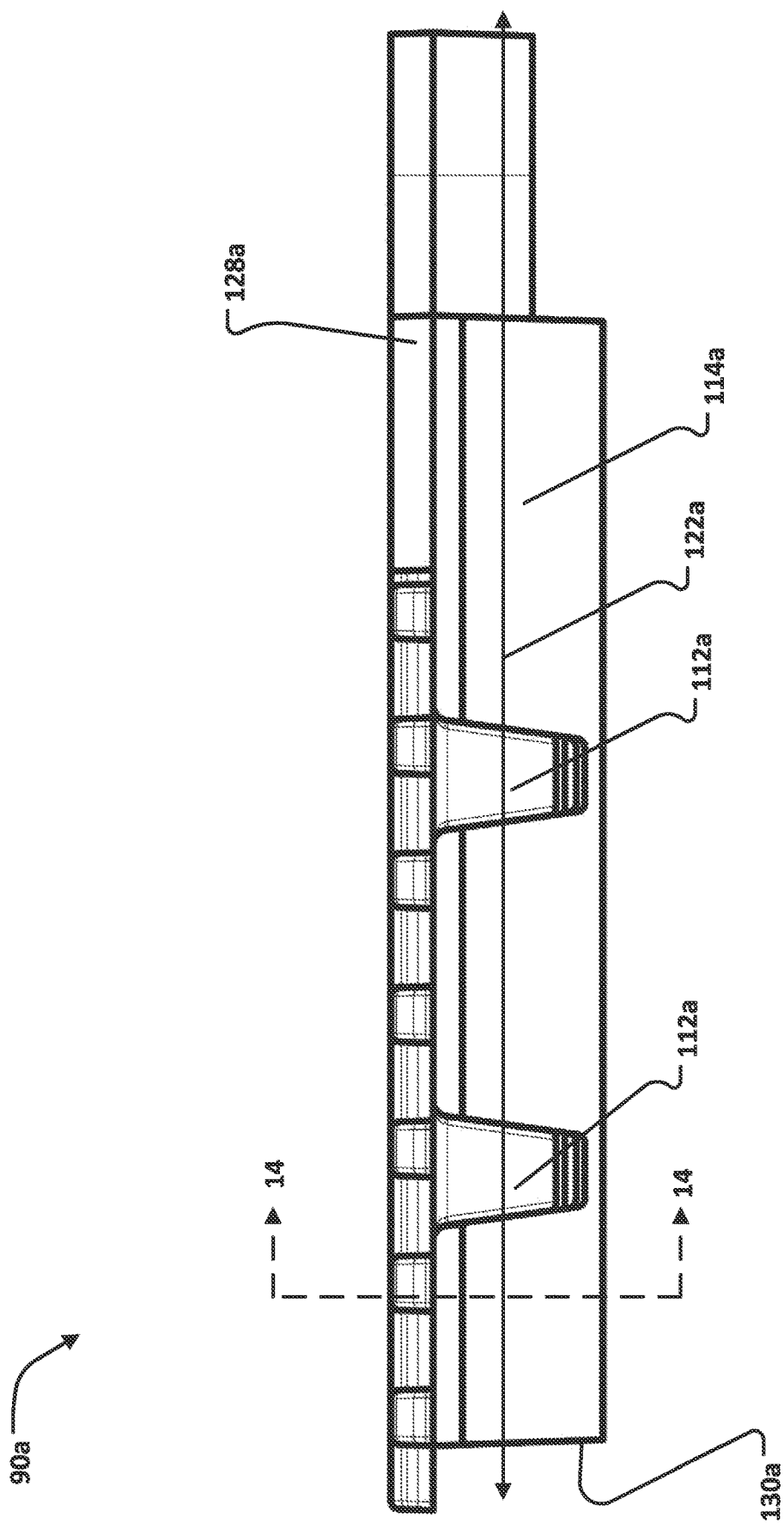
FIG. 13 is a side view of another exemplary embodiment of a light guiding trough as used in an edge sensing apparatus.
Figure 14:
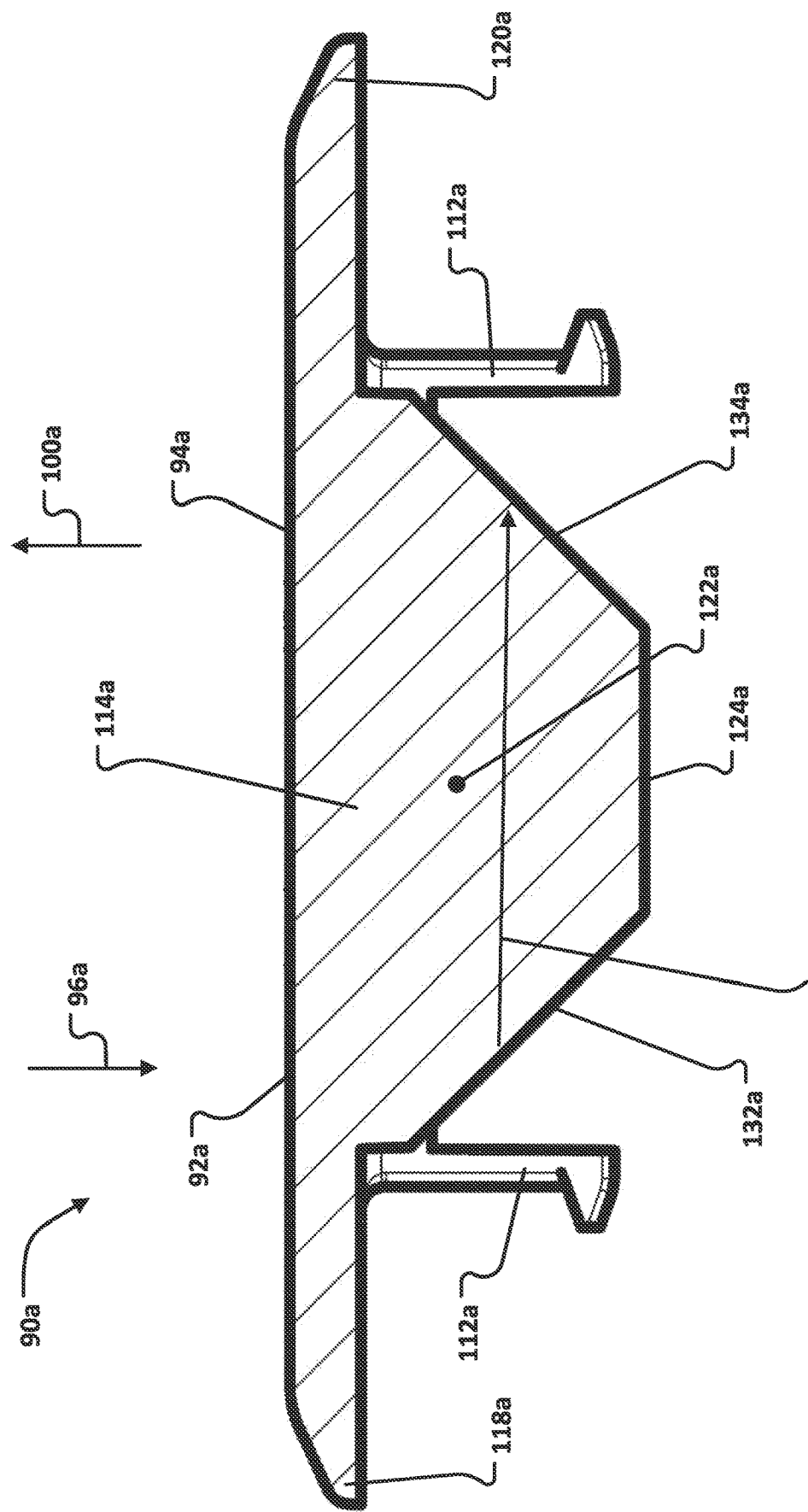
FIG. 14 is a cross-section through section lines 14-14 in FIG. 13.

FIG. 13 is a side view of light guiding trough 90a and FIG. 14 is an end view of light guiding trough 90a. The exemplary light guiding trough 90a omits an over-molded portion, such as over-molded portion 116 shown in FIG. 7A. A body or light transmitting portion 114a of the light guiding trough 90a defines retaining fasteners 112a used to mount the light guiding trough 90a to another structure. The retaining fasteners 112a can interconnect the light guiding trough 90a to the second platen 70 (shown in FIG. 5). The light transmitting portion 114a of the light guiding trough 90a can be optically transparent and can be the operative portion for the guiding of light from the light emitter 86.

Figure 15:
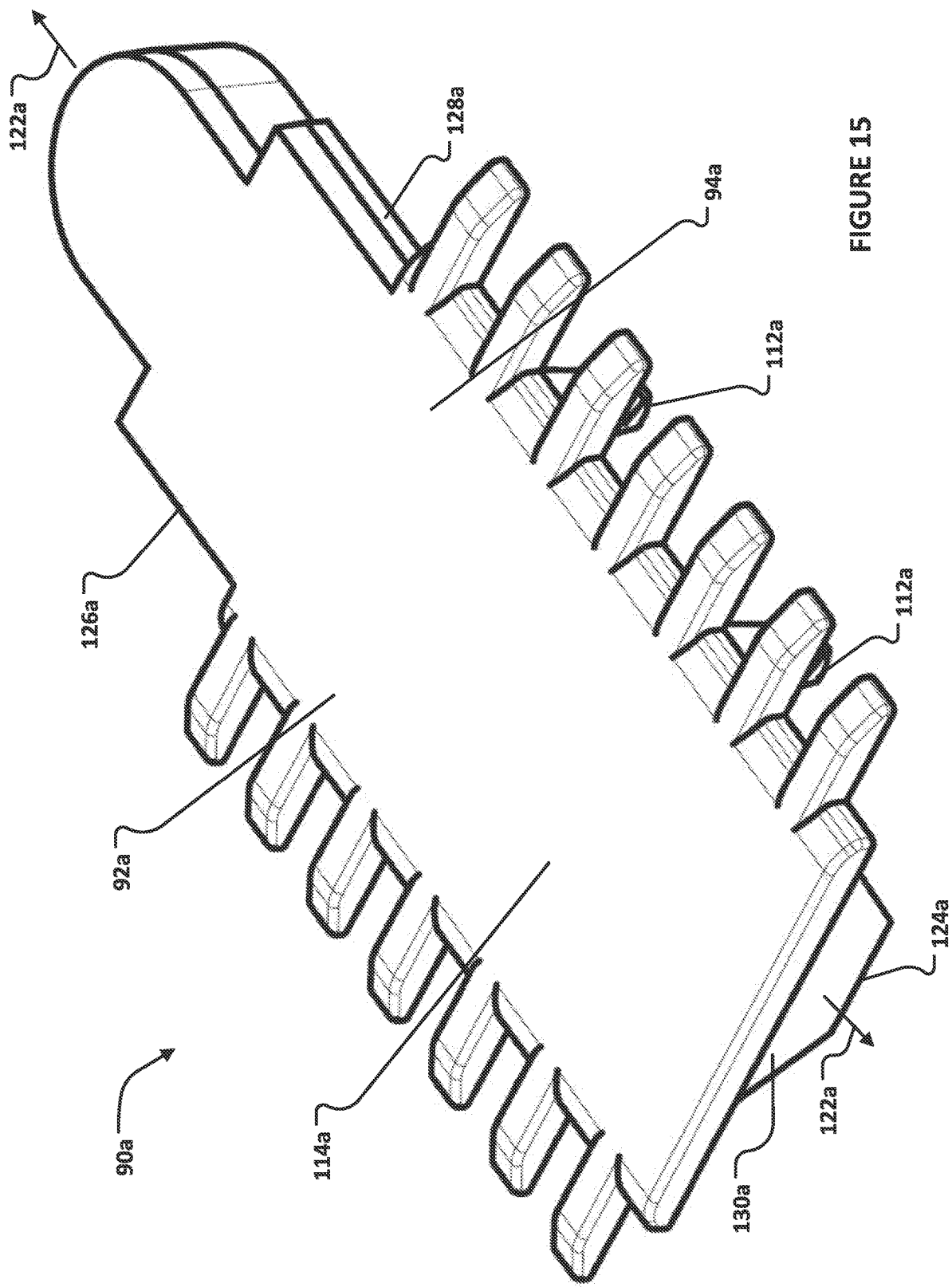
FIG. 15 is a perspective view of the exemplary light guiding trough shown in FIGS. 13 and 14.
Figure 16:
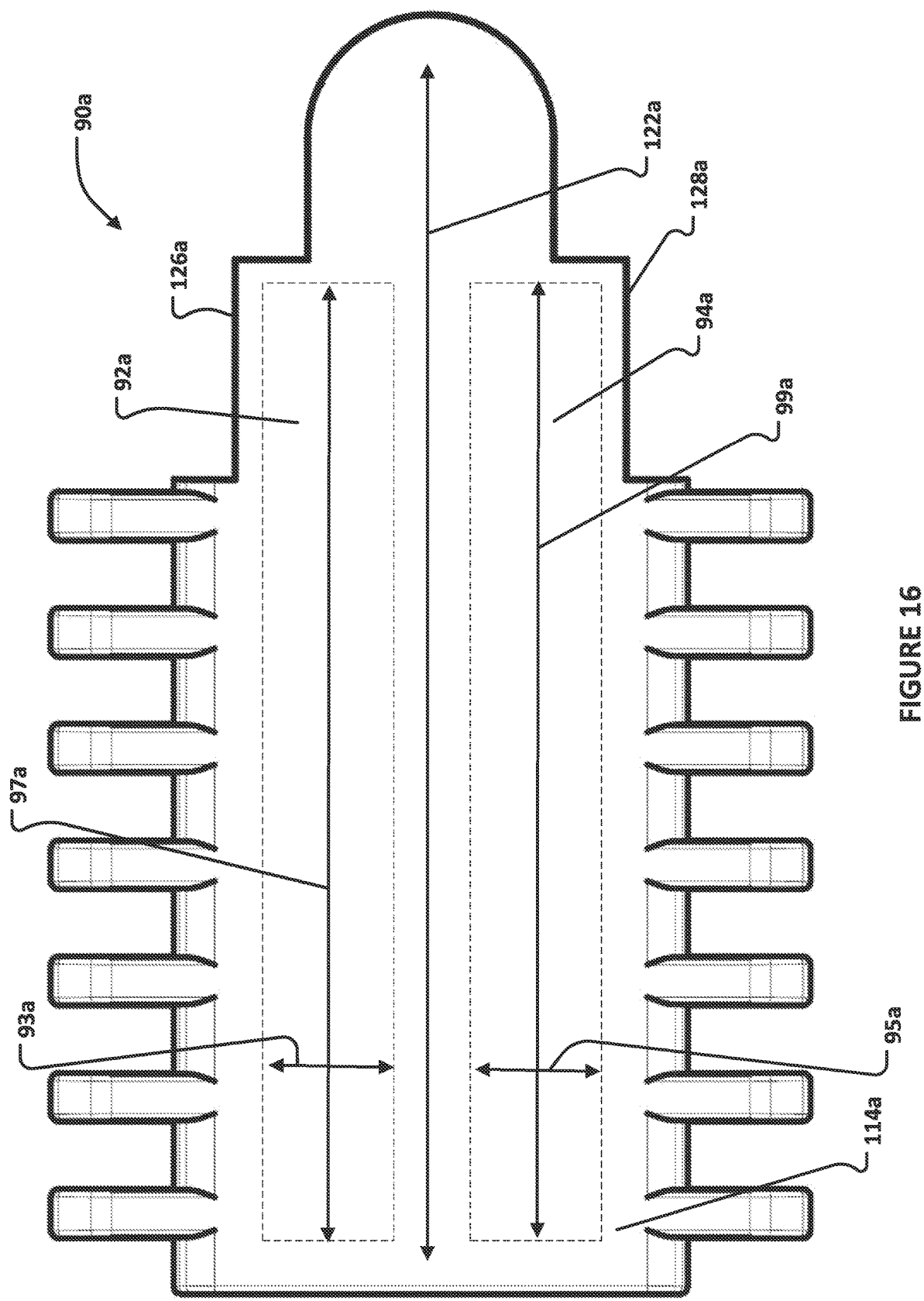
FIG. 16 is a top view of the exemplary light guiding trough shown in FIGS. 13-15.

The exemplary light guiding trough 90a has a two-dimensional truncated vee-shape in a first plane. The first plane is the plane of view of FIG. 14. The truncated vee-shape can have a first end 118a, a second end 120a and a linear truncated end 124a. The light guiding trough 90a can be further spatially defined by the truncated vee-shape extending along a trough axis 122a, which can be normal to the first plane that defines the two-dimensional truncated vee-shape. This extension can result in the creation of a three-dimensional truncated vee-shaped volume that can have a first linear end 126a, a second linear end 128a, and a planar truncated end 130a, which can be seen in FIG. 15. In the resulting three-dimensional shape of the light guiding trough 90a, a first face portion 92a can be bounded on one side by the first linear end 126a and a second face portion 94a can be bounded on one side by second linear end 128a of the light guiding trough 90a. Generally, the first face 92a and the second face 94a can each be of a rectangular shape, having, respectively, a short axis 93a, 95a and a long axis 97a, 99a. The long axes 97a, 99a of the first face 92a and the second face 94a can be transverse to the direction of movement of the paper. The long axes 97a, 99a of the first face 92a and the second face 94a can be coplanar.

The light guiding trough 90a can be thus configured such that light received by the first face portion 92a in the first direction 96a at a point along said trough axis 122a, can be reflected internally in a second direction 98a at a first external surface 132a across the planar truncated end 130a, can be reflected again internally at a second external surface 134a, and can be emitted in a third direction 100a from the second face portion 94a at the same point along the trough axis 122a.

Various considerations can be applied in manufacturing the light guiding trough 90a to inhibit the passage of light out of the light guiding trough 90a other than through the face portion 94a. For example, the dimensions of various portions and the material used to form the light guiding trough 90a can be varied. Also, the mold used to form the light guiding trough 90a can produce various levels of surface finishes on different portions of the light guiding trough 90a. This can be accomplished by various levels of polishing on the internal surfaces within the mold. For example, if the portions of the mold that produce the surfaces 132a and 134a are relatively highly polished, it has been found that the reflection of light off of the surfaces 132a and 134a will be enhanced and leakage of light through the surfaces 132a, 134a will be inhibited.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein is hereby unconditionally reserved. The use of the word "can" in this document is not an assertion that the subject preceding the word is unimportant or unnecessary or "not critical" relative to anything else in this document. The word "can" is used herein in a positive and affirming sense and no other motive should be presumed. More than one "invention" may be disclosed in the present disclosure; an "invention" is defined by the content of a patent claim and not by the content of a detailed description of an embodiment of an invention.

What is claimed is:

1. A sensing apparatus configured to detect an edge of a paper received in an automated transaction machine (ATM) comprising:
    a top platen;
    a bottom platen spaced from said top platen whereby a path within the ATM is defined between said top platen and said bottom platen;
    a light emitter positioned along the path of movement of the paper and on a first side of said path, said light emitter directed to emit light across said path to a second side of said path, said second side of said path the opposite of said first side of said path;
    a light detector positioned along said path on said first side of said path with said light emitter, said light detector configured to detect light and emit a signal corresponding to an amount of detected light;
    a control circuit configured to control a flow of power to said light emitter and to receive the signal emitted by said light detector;
    a light guiding trough mounted on said bottom platen and thereby positioned on said second side of said path and having first and second faces, each of said first and second faces facing said path, said first face positioned to confront said light emitter and thereby receive light emitted by said light emitter, said second face positioned to confront said light detector and thereby emit light toward said light detector;
    at least one roller positioned in between said top platen the bottom platen and configured to engage and move the paper along said path;
    at least one wheel positioned in between the top platen the bottom platen, the at least one wheel configured to engage the paper and move at least a portion of the paper transverse to the path;
    at least one plate mounted on said top platen for movement toward and away from a central axis of said path, wherein at least one of said light emitter and said light detector is mounted on the at least one plate; and
    a motor engaged with said at least one plate and controlled by said control circuit to move said at least one plate.

2. The sensing apparatus of claim 1 wherein said first and second faces of said light guiding trough are each of a rectangular shape having a short axis and a long axis.

3. The sensing apparatus of claim 2 wherein said long axes of said light guiding trough are transverse to said path of movement of the paper.

4. The sensing apparatus of claim 1 wherein said first and second faces of said light guiding trough are coplanar.

5. The sensing apparatus of claim 1 wherein:
    said light emitter emits a field of light centered on a primary light axis that is transverse to said path;
    said light guiding trough comprises a first external surface defining a first internal reflective plane and a second external surface defining a second internal reflective plane;
    light projects from said light emitter in a first direction from said first side of said path toward said second side of said path, then enters said light guiding trough through said first face along the primary light axis, then reflects off of said first internal reflective plane in a second direction toward said second internal reflective plane, then reflects off of said second internal reflective plane in a third direction toward said second face, then passes out of said second face toward said light detector; and said first external surface and said second external surface are spaced from one another along said path whereby said second direction is also along said path.

6. The sensing apparatus of claim 1 wherein said light emitter and said light detector are spaced from one another along said path.

7. The sensing apparatus of claim 1 wherein said light guiding trough having a two-dimensional truncated vee-shape in a first plane, said first plane being parallel to said path, said truncated vee-shape having a first end, a second end and a linear truncated end, wherein said light guiding trough is further spatially defined by said truncated vee-shape extending along a trough axis normal to said first plane and said path, to create a three-dimensional truncated vee-shaped volume having a first linear end, a second linear end and a planar truncated end, wherein said first face is bounded on one side by said first linear end of said three-dimensional truncated vee-shaped volume and said second face is bounded on one side by second linear end of said three-dimensional truncated vee-shaped volume, and wherein said light guiding trough is configured such that light received by said first face at a point along said trough axis is reflected internally across said planar truncated end and emitted from said second face at the point along said trough axis.

8. A method for detecting an edge of a paper received in an automated transaction machine (ATM) comprising:
    positioning at least one light emitter along a path of movement of the paper and on a first side of the path, the path defined in the ATM, the light emitter emitting light across the path to a second side of the path, the second side of the path the opposite of the first side of the path;
    positioning at least one light detector along the path on the first side of the path with the light emitter, the light detector configured to detect light and emit a signal corresponding to an amount of detected light;
    arranging the at least one light emitter a greater distance from a central axis of the path than the at least one light detector;
    controlling a flow of power to the light emitter with a control circuit;
    receiving the signal emitted from the light detector with the control circuit; and
    positioning first and second faces of at least one light guiding trough toward the path on the second side of the path, the first face confronting the light emitter and thereby receiving light emitted by the light emitter, the second face confronting the light detector and thereby emitting light toward the light detector.

9. The method of claim 8 further comprising:
    defining the path in the ATM between a top platen and a bottom platen;
    supporting at least one plate on the top platen for movement toward and away from a central axis of the path;
    mounting the at least one light emitter and the at least one light detector on the at least one plate;
    mounting the at least one light guiding trough on the bottom platen;
    positioning at least one roller in between the top platen the bottom platen, the at least one roller configured to engage and move the paper along the path; and
    positioning at least one wheel in between the top platen the bottom platen, the at least one wheel configured to engage the paper and move at least a portion of the paper transverse to the path.

10. The method of claim 9 further comprising:
    directing light emitted by the at least one light emitter a greater distance parallel to the central axis of the path than transverse to the central axis.

11. The method of claim 9 wherein:
    said positioning the at least one light emitter is further defined as positioning a plurality of light emitters spaced from one another along the path on the first side of the path;
    said positioning the at least one light detector is further defined as positioning a plurality of light detectors spaced from one another along the path on the first side of the path with the plurality of light emitters;
    said controlling the flow of power is further defined as controlling the flow of power to each of the plurality of light emitters with the control circuit;
    said receiving the signal is further defined as receiving respective signals emitted from each of the plurality of light detectors with the control circuit;
    said positioning first and second faces is further defined as positioning respective first and second faces of a plurality of light guiding troughs toward the path on the second side of the path, wherein each of the respective first faces confronts one of the plurality of light emitters and thereby receives light emitted by the respective light emitter, and wherein each of the respective second faces confronts one of the plurality of light detectors and thereby emits light toward the respective light detector;
    said supporting at least one plate is further defined as supporting a first plate and a second plate on the top platen for movement toward and away from the central axis of the path, the movement of the first plate mirrored by the movement of the second plate across the central axis; and
    said positioning at least one wheel is further defined as positioning a first wheel and a second wheel in between the top platen the bottom platen and spaced from one another along the central axis, each of the first wheel and the second wheel configured to engage the paper and move at least a portion of the paper transverse to the path.

12. The method of claim 11 further comprising:
    fixing a first light emitter and a second light emitter of the plurality of light emitters and a first light detector and a second light detector of the plurality of light detectors to the first plate;
    fixing a third light emitter and a fourth light emitter of the plurality of light emitters and a third light detector and a fourth light detector of the plurality of light detectors to the second plate;
    emitting light from each of the first, second, third and fourth light emitters whereby light is received by each of the first, second, third and fourth light detectors;
    receiving a paper on the path between the top platen and the bottom platen;
    moving the first plate and the second plate toward the central axis of the path;
    monitoring, with the control circuit, respective signals from the first, second, third and fourth light detectors during said moving;
    initiating, with the control circuit, rotation of the one of the first wheel and second wheel in response to a first detected amount of light received by at least one of the first, second, third and fourth light detectors dropping below a predetermined amount during said monitoring, the one of the first wheel and second wheel being the closest of the first wheel and the second wheel to the at least one of the first, second, third and fourth light detectors at which the first detected amount of light dropped below the predetermined amount, the direction of rotation causing the at least a portion of the paper to move toward the central axis of the path; and maintaining, with the control circuit, the other of the first wheel and second wheel stationary until a second detected amount light received by another of the first, second, third and fourth light detectors drops below the predetermined amount during said monitoring.

13. An automated transaction machine (ATM) comprising:
   a center and de-skew assembly configured to receive a paper and including:
      a first platen defining a first side of a path of movement of the paper,
      a second platen that defines a second side of said path opposite said first side, the path defined by a gap between said first platen and said second platen,
      at least one plate mounted on said first platen for movement toward and away from a central axis of said path,
      at least one roller extending into the gap between said first platen and said second platen and configured to engage the paper and move the paper along said path,
      at least one wheel extending into said gap and configured to engage the paper and move at least a portion of the paper transverse to said path; and
   at least one sensing apparatus positioned along said path, configured to detect an edge of received paper, and including:
      a first light emitter mounted on said at least one plate and thereby positioned along said path on said first side of said path, said first light emitter directed to emit light across said path to said second side of said path,
      a first light detector mounted on said at least one plate and thereby positioned along said path on said first side with said first light emitter, said first light detector configured to detect light and emit a signal corresponding to an amount of detected light,
      a control circuit configured to control a flow of power to said at least one light emitter and to receive the signal emitted by said at least one light detector,
      a first light guiding trough positioned on said second side of said path and having first and second faces, each of said first and second faces facing said path, said first face positioned to confront said first light emitter and thereby receive light emitted by said first light emitter, said second face positioned to confront said first light detector and thereby emit light toward said first light detector,
      a second light emitter mounted on said at least one plate and thereby positioned along said path on said first side of said path, said second light emitter directed to emit light across said path to said second side of said path,
      a second light detector mounted on said at least one plate and thereby positioned along said path on said first side with said a second light emitter, said second light detector configured to detect light and emit a signal corresponding to an amount of detected light,
      wherein said control circuit configured to control a flow of power to said second light emitter and to receive the signal emitted by said second light detector, and
      a second light guiding trough positioned on said second side of said path and having first and second faces, each of said first and second faces of said second light guiding trough facing said path, said first face of said second light guiding trough positioned to confront said second light emitter and thereby receive light emitted by said second light emitter, said second face positioned to confront said second light detector and thereby emit light toward said second light detector, and
      wherein said first light emitter and said second light emitter are adjacent to one another along said path are positioned between said first and second light detectors.

14. The ATM of claim 13 wherein:
   said first light emitter emits a field of light centered on a primary light axis that is transverse to said path;
   said first light guiding trough comprises a first external surface defining a first internal reflective plane and a second external surface defining a second internal reflective plane;
   the light projects from said first light emitter in a first direction from said first side of said path toward said second side of said path, then enters said first light guiding trough through said first face along said primary light axis, then reflects off of said first internal reflective plane in a second direction toward said second internal reflective plane, then reflects off of said second internal reflective plane in a third direction toward said second face, then passes out of said second face toward said first light detector; and
   said first external surface and said second external surface are spaced from the second platen such that a first air gap is defined between the first external surface and the second platen and a second air gap is defined between the second external surface and the second platen.

15. The ATM of claim 13 wherein said first light guiding trough further comprises:
   a plurality of integrated retaining fasteners securing said first light guiding trough to said second platen.

16. The ATM of claim 13 wherein said first light guiding trough further comprises:
   a light transmitting portion; and
   a plurality of framing portions over-molded on said light transmitting portion that are opaque and extend at least partially around said first and second faces of said first light guiding trough to prevent light leakage.

17. The ATM of claim 16 wherein said framing portions interconnect said light transmitting portion and said second platen.

18. The ATM of claim 13 wherein said first light emitter is positioned a greater distance from a center axis of said path than said at least one light detector.

19. The ATM of claim 13 wherein:
   said first platen and said second platen are positioned parallel to each other in a first operational mode,
   said first platen and said second platen are positioned at an angle to each other in a maintenance mode, and
   said first light trough is structurally isolated from both said first emitter and said first detector whereby said first and second platens are not inhibited from moving relative to one another from the operational mode to the maintenance mode by said at least one sensing apparatus.

* * * * *